United States Patent
Zheng et al.

(10) Patent No.: US 8,743,980 B2
(45) Date of Patent: Jun. 3, 2014

(54) METHOD OF DESIGNING REFERENCE SIGNAL PATTERN AND RELATED COMMUNICATION DEVICE

(75) Inventors: Yan-Xiu Zheng, New Taipei (TW); Chang-Lan Tsai, New Taipei (TW); Chung-Lien Ho, New Taipei (TW)

(73) Assignee: Acer Incorporated, New Taipei (TW)

( * ) Notice: Subject to any disclaimer, the term of this patent is extended or adjusted under 35 U.S.C. 154(b) by 331 days.

(21) Appl. No.: 13/175,956

(22) Filed: Jul. 5, 2011

(65) Prior Publication Data

US 2012/0039405 A1 Feb. 16, 2012

Related U.S. Application Data

(60) Provisional application No. 61/373,100, filed on Aug. 12, 2010.

(51) Int. Cl.
*H04L 27/28* (2006.01)

(52) U.S. Cl.
USPC .......................................................... 375/260

(58) Field of Classification Search
USPC .................. 375/260; 370/330, 328, 241, 329; 455/509
See application file for complete search history.

(56) References Cited

U.S. PATENT DOCUMENTS

| | | | |
|---|---|---|---|
| 2010/0195615 A1 | 8/2010 | Lee | |
| 2010/0195748 A1* | 8/2010 | Nam et al. | 375/260 |
| 2010/0322100 A1* | 12/2010 | Wan et al. | 370/252 |
| 2011/0143655 A1* | 6/2011 | Ahn et al. | 455/9 |
| 2011/0176499 A1* | 7/2011 | Siomina et al. | 370/329 |
| 2012/0020323 A1* | 1/2012 | Noh et al. | 370/330 |
| 2012/0039298 A1* | 2/2012 | Lee et al. | 370/330 |
| 2012/0076106 A1* | 3/2012 | Bhattad et al. | 370/330 |
| 2012/0134273 A1* | 5/2012 | Bhattad et al. | 370/241 |
| 2012/0140718 A1* | 6/2012 | Jiang et al. | 370/329 |
| 2012/0163335 A1* | 6/2012 | Chung et al. | 370/330 |
| 2012/0188988 A1* | 7/2012 | Chung et al. | 370/335 |

FOREIGN PATENT DOCUMENTS

CN 101626620 A 1/2010

* cited by examiner

*Primary Examiner* — Shuwang Liu
*Assistant Examiner* — Helene Tayong
(74) *Attorney, Agent, or Firm* — Winston Hsu; Scott Margo

(57) ABSTRACT

A method of designing a reference signal pattern for a network in a wireless communication system is disclosed. The method comprises transmitting a plurality of cell-specific reference signal (CRSs) in a subframe, the subframe comprising a plurality of resource elements that are divided in time across a plurality of subcarriers to form a plurality of orthogonal frequency division multiplexed (OFDM) symbols, each of the plurality of resource element occupying a predetermined amount of time on a respective one of the plurality of subcarriers. wherein, a first set of the plurality of CRSs is allocated to a first set of the plurality resource elements on a first symbol and a second symbol over a third subcarrier, a sixth subcarrier, a ninth subcarrier and a twelfth subcarrier.

24 Claims, 26 Drawing Sheets

METHOD OF DESIGNING REFERENCE SIGNAL PATTERN AND RELATED COMMUNICATION DEVICE

CROSS REFERENCE TO RELATED APPLICATIONS

This application claims the benefit of U.S. Provisional Application No. 61/373,100 filed on Aug. 12, 2010, the contents of which are incorporated herein.

BACKGROUND OF THE INVENTION

1. Field of the Invention

The application relates to a method and a related communication device used in a wireless communication system and related communication device, and more particularly, to a method of designing a reference pattern and a related communication device in a wireless communication system.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

A long term evolution-advanced (LTE-A) system, as its name implies, is an evolution of the LTE system, considering relaying for cost-effective throughput enhancement and coverage extension. The LTE-A system includes all of the features of the LTE system and several new ones, the most important of which are: carrier aggregation, enhanced multi-antenna support and relaying. The LTE system provides extensive support for deployment in spectrum allocations of various characteristics, with transmission bandwidths ranging from 1.4 MHz up to 20 MHz. In the LTE-A system, the transmission bandwidth can be further extended with carrier aggregation wherein multiple component carriers are aggregated and jointly used for transmission to/from a signal UE. In general, up to five component carriers can be aggregated, allowing for transmission bandwidth up to 100 MHz. In addition to wider bandwidth, LTE-A system is also expected to provide higher data rates and improved system performance. It will do this by further extending the support for multi-antenna transmission compared to the first release of LTE. For the downlink (DL), up to eight layers can be transmitted using an 8×8 antenna configuration. This allows for a peak spectral efficiency exceeding the requirement of 30 bits/s/Hz and implies a possibility for data rates beyond 1 G bit/s in a 40-MHz bandwidth and even higher data rates with wider bandwidth.

Technology for supporting reliable and high-speed data service includes Orthogonal Frequency Division Multiplexing (OFDM), Multiple Input Multiple Output (MIMO), and so on.

An OFDM system is being considered after the 3rd generation system which is able to attenuate the ISI effect with low complexity. The OFDM system converts symbols, received in series, into N (N is a natural number) parallel symbols and transmits them on respective separated N subcarriers. The subcarriers maintain orthogonality in the frequency domain. It is expected that the market for mobile communication will shift from the existing Code Division Multiple Access (CDMA) system to an OFDM-based system.

In order to carry out coherent demodulation in LTE down link, channel estimation is needed at the receiver end. In case of OFDM transmission known reference symbols are added into time-frequency grid for channel estimation. These signals are called LTE Downlink Reference signals. DL reference signals are exploited for downlink channel estimation for coherent demodulation/detection, downlink channel quality measurements, and cell search/acquisition. Different DL reference signals have been introduced in Release 10. A cell-specific RS is transmitted in each physical antenna port. It is used for both demodulation and measurement purpose. Its pattern design ensures channel estimation accuracy. LTE-A eNB should always support LTE UE as well. It is also used for LTE-A UEs to detect PCFICH, PHICH, PDCCH, PBCH, and PDSCH (transmit diversity only). A demodulation reference signal (DM-RS) are supported for transmission of PDSCH and transmitted on antenna port (s), or, where is the number of layers used for transmission of the PDSCH. The DMRS can be precoded, and supports non-codebook-based precoding. It will enable application of enhanced multi-user beamforming, such as zero forcing (ZF) for 4×2 MIMO. The DMRS pattern for higher numbers of layers is extended from a 2-layer format for transmission mode 8 in Release 9.

In OFDM systems, assigning a reference signal to all subcarriers is performed in order to achieve the performance of channel estimation. Reference signal patterns should be designed with small overhead and satisfactory channel estimation performance for control signals.

SUMMARY OF THE INVENTION

A method of designing a reference signal pattern in a wireless communication system is provided.

A method of designing a reference signal pattern for a network in a wireless communication system is disclosed. The method comprises transmitting a plurality of cell-specific reference signal (CRSs) in a subframe, the subframe comprising a plurality of resource elements that are divided in time across a plurality of subcarriers to form a plurality of orthogonal frequency division multiplexed (OFDM) symbols, each of the plurality of resource element occupying a predetermined amount of time on a respective one of the plurality of subcarriers. wherein, a first set of the plurality of CRSs is allocated to a first set of the plurality resource elements on a first symbol and a second symbol over a third subcarrier, a sixth subcarrier, a ninth subcarrier and a twelfth subcarrier.

A communication device for designing a reference signal pattern in a wireless communication system is disclosed. The communication device comprises means for transmitting a plurality of cell-specific reference signal (CRSs) in a subframe, the subframe comprising a plurality of resource elements that are divided in time across a plurality of subcarriers to form a plurality of orthogonal frequency division multiplexed (OFDM) symbols, each of the plurality of resource element occupying a predetermined amount of time on a respective one of the plurality of subcarriers. wherein, a first set of the plurality of CRSs is allocated to a first set of the plurality resource elements on a first symbol and a second symbol over a third subcarrier, a sixth subcarrier, a ninth subcarrier and a twelfth subcarrier.

A method of designing reference signal pattern for a mobile device in a wireless communication system is disclosed. The method comprises receiving a plurality of cell-specific reference signal (CRSs) in a subframe, the subframe comprising a plurality of resource elements that are divided in time across a plurality of subcarriers to form a plurality of orthogonal frequency division multiplexed (OFDM) symbols, each of the plurality of resource element occupying a predetermined amount of time on a respective one of the plurality of subcarriers. wherein, a first set of the plurality of CRSs is allocated to a first set of the plurality resource elements on a first symbol and a second symbol over a third subcarrier, a sixth subcarrier, a ninth subcarrier and a twelfth subcarrier.

A communication device for designing a reference signal pattern in a wireless communication system is disclosed. The communication device comprises means for receiving a plurality of cell-specific reference signal (CRSs) in a subframe, the subframe comprising a plurality of resource elements that are divided in time across a plurality of subcarriers to form a plurality of orthogonal frequency division multiplexed (OFDM) symbols, each of the plurality of resource element occupying a predetermined amount of time on a respective one of the plurality of subcarriers; wherein, a first set of the plurality of CRSs is allocated to a first set of the plurality resource elements on a first symbol and a second symbol over a third subcarrier, a sixth subcarrier, a ninth subcarrier and a twelfth subcarrier.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 5-26 are schematic diagrams of exemplary reference signal patterns.

DETAILED DESCRIPTION

Figure 1:
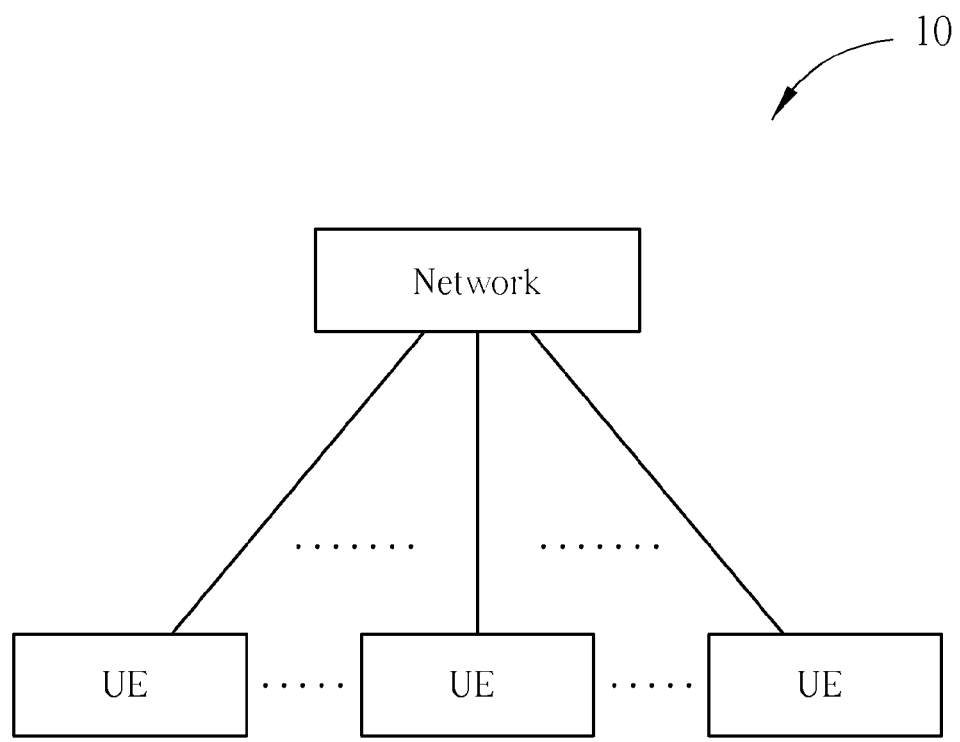
FIG. 1 is a schematic diagram of an exemplary wireless communication system.

Please refer to FIG. 1. FIG. 1 is a schematic diagram of an exemplary wireless communication system 10. The wireless communication system 10 can be an LTE-Advanced system, or other mobile communication systems (e.g. LTE, WCDMA, HSPA, GSM, EDGE, etc.). The wireless communication system 10 is briefly composed of a network and a plurality of user equipments (UEs), as the structure illustrated in FIG. 1. In the LTE-Advanced system, the network is referred as an evolved universal terrestrial radio access network (E-UTRAN) comprising a plurality of evolved base stations (eNBs). The UEs can be devices such as mobile phones, computer systems, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
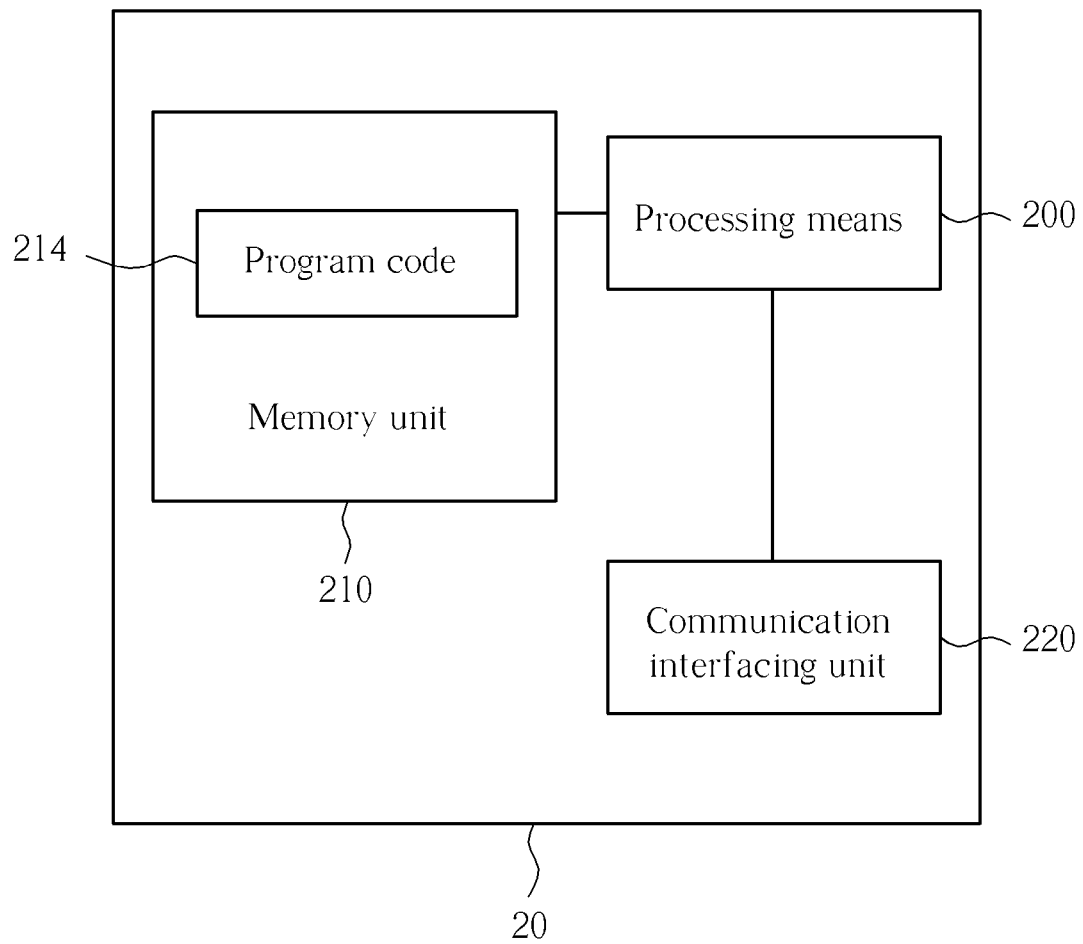
FIG. 2 is a schematic diagram of an exemplary communication device.

Please refer to FIG. 2. FIG. 2 is a schematic diagram of an exemplary communication device 20. The communication device 20 can be the UE or the network shown in FIG. 1 and may include a processing means 200 such as a microprocessor or ASIC, a memory unit 210, and a communication interfacing unit 220. The memory unit 210 may be any data storage device that can store program code 214 for access by the processing means 200. Examples of the memory unit 210 include but are not limited to a subscriber identity module (SIM), read-only memory (ROM), random-access memory (RAM), CD-ROMs, magnetic tapes, floppy disks, and optical data storage devices. The communication interfacing unit 220 is preferably a radio transceiver for wirelessly communicating with the network according to processing results of the processing means 200.

Figure 3:
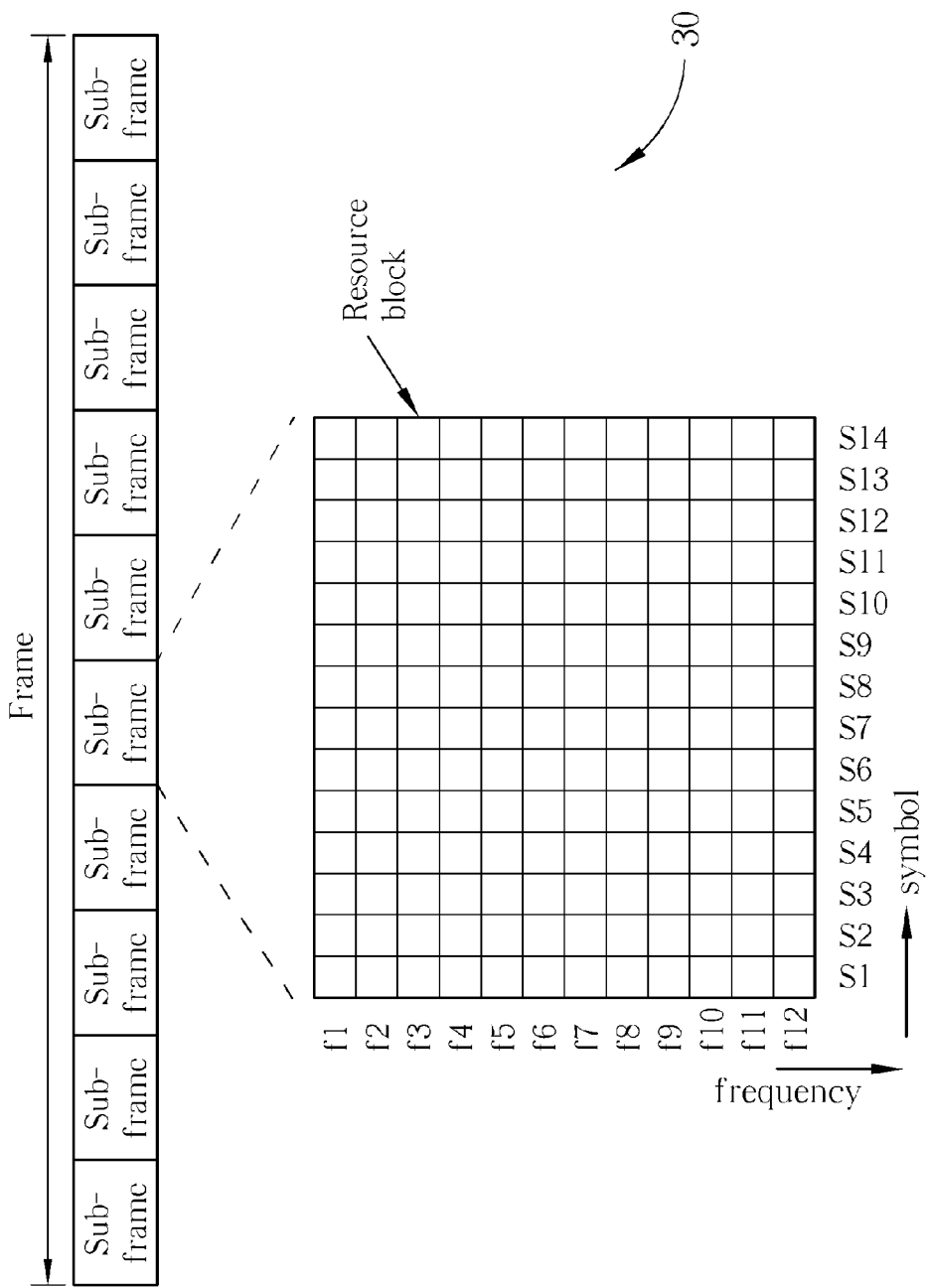
FIG. 3 illustrates an exemplary lattice.

In wireless communication system 10, Orthogonal Frequency-Division Multiple Access (OFDMA) may be selected for downlink for multi-carrier technology as to provide a very flexible multiple access scheme. The OFDMA enables the downlink signal to be subdivided into small units of time and frequency. Please refer to FIG. 3, which illustrates a two-dimensional lattice 30 in time and frequency. In the lattice 30, one subframe comprises two slots, each slot comprising seven OFDM symbols in the case of a normal cyclic prefix length, or six if the extended cyclic prefix is configured. In the frequency domain, resources are grouped in units of twelve subcarriers, such that one unit of twelve subcarriers for a duration of two slots is termed a resource block (RB). A small unit, resource element, consists of one subcarriers for a duration of one OFDM symbol. A resource block is comprised of 168 resource elements in the case of the normal cyclic prefix length, and 144 resource elements in the case of the extended cyclic prefix. In the lattice 30, the subcarriers from top to bottom are f1, f2, f3, f4, f5, f6, f7, f8, f9, f10, f11 and f12; the symbols from left to right are S1, S2, S3, S4, S5, S6, S7, S8, S9, S10, S11, S12, S13 and S14.

Figure 4:
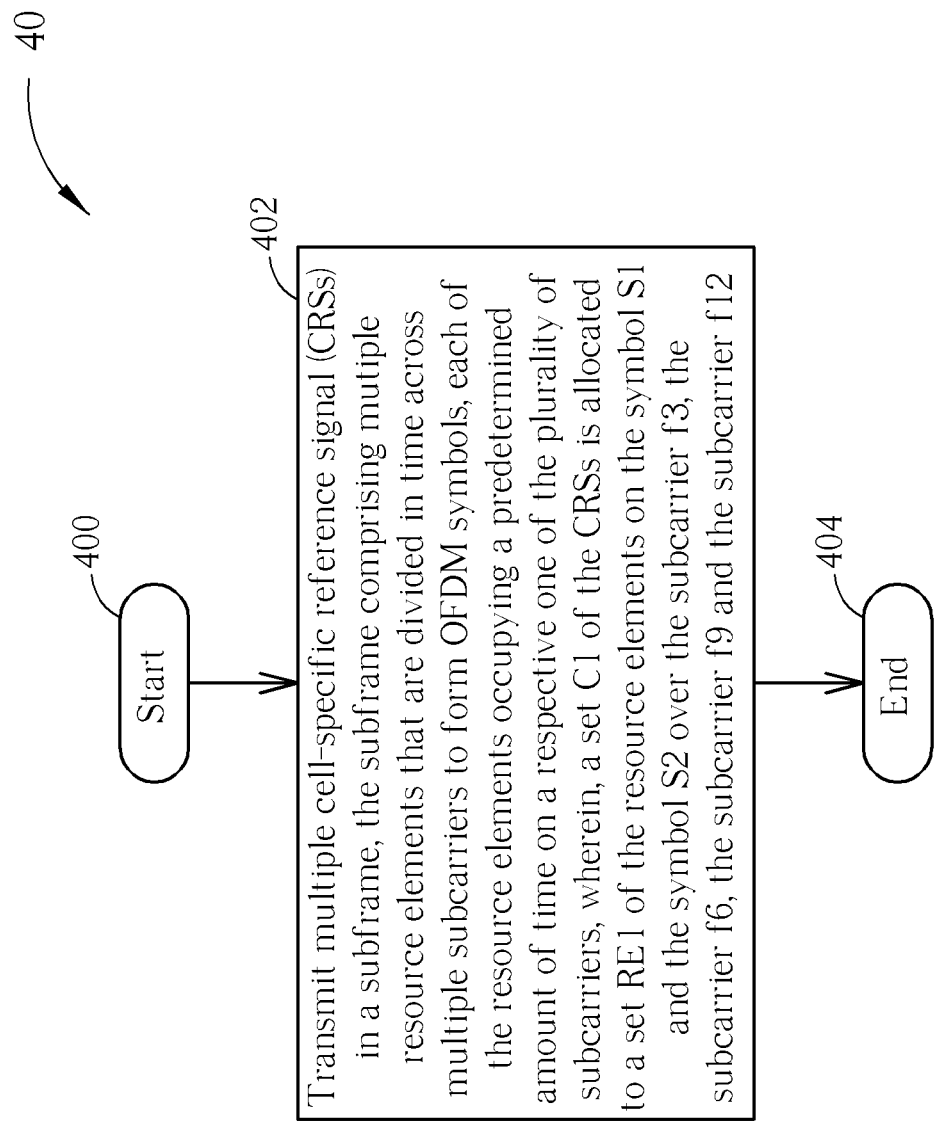
FIG. 4 is a flowchart of an exemplary process.

Please refer to FIG. 4, which is a flow chart of an exemplary process 40. The process 40 is used for designing reference signal pattern for a network in a wireless communication system. The wireless communication system could be the wireless communication system 10. The process 40 can be compiled into the program code 214 and includes the following steps:

Step 400: Start.

Step 402: Transmit multiple cell-specific reference signal (CRSs) in a subframe, the subframe comprising multiple resource elements that are divided in time across multiple subcarriers to form OFDM symbols, each of the resource elements occupying a predetermined amount of time on a respective one of the plurality of subcarriers, wherein, a set C1 of the CRSs is allocated to a set RE1 of the resource elements on the symbol S1 and the symbol S2 over the subcarrier f3, the subcarrier f6, the subcarrier f9 and the subcarrier f12.

Step 404: End.

According to the process 40, the network transmit the set C1 of the CRSs on the set RE1 of the resource elements, which consist of the subcarrier f3, the subcarrier f6, the subcarrier f9 and the subcarrier f12 for duration of OFDM symbols S1 and S2. In other words, the CRSs in the set C1 are transmitted on a control channel region (i.e. first three symbols in the subframe). Therefore, sufficient CRSs are used for decoding control signals on physical downlink control channel (PDCCH) and reducing overhead. Compared to the prior art, the first two CRSs in time domain are kept, the others are neglected.

In addition, the network may transmit multiple demodulation reference signal (DMRSs) in the same subframe. A set D1 of the DMRSs is allocated to a set RE 3 of the resource elements on the symbols S6, S7, S13 and S14 over the subcarriers f1, f2, f6, f7, f11 and f12 in the case of the normal cyclic prefix length and on the symbols S5, S6, S13 and S14 over the subcarriers f1, f2, f6, f7, f11 and f12 in the case of the extended cyclic prefix length.

Figure 5:
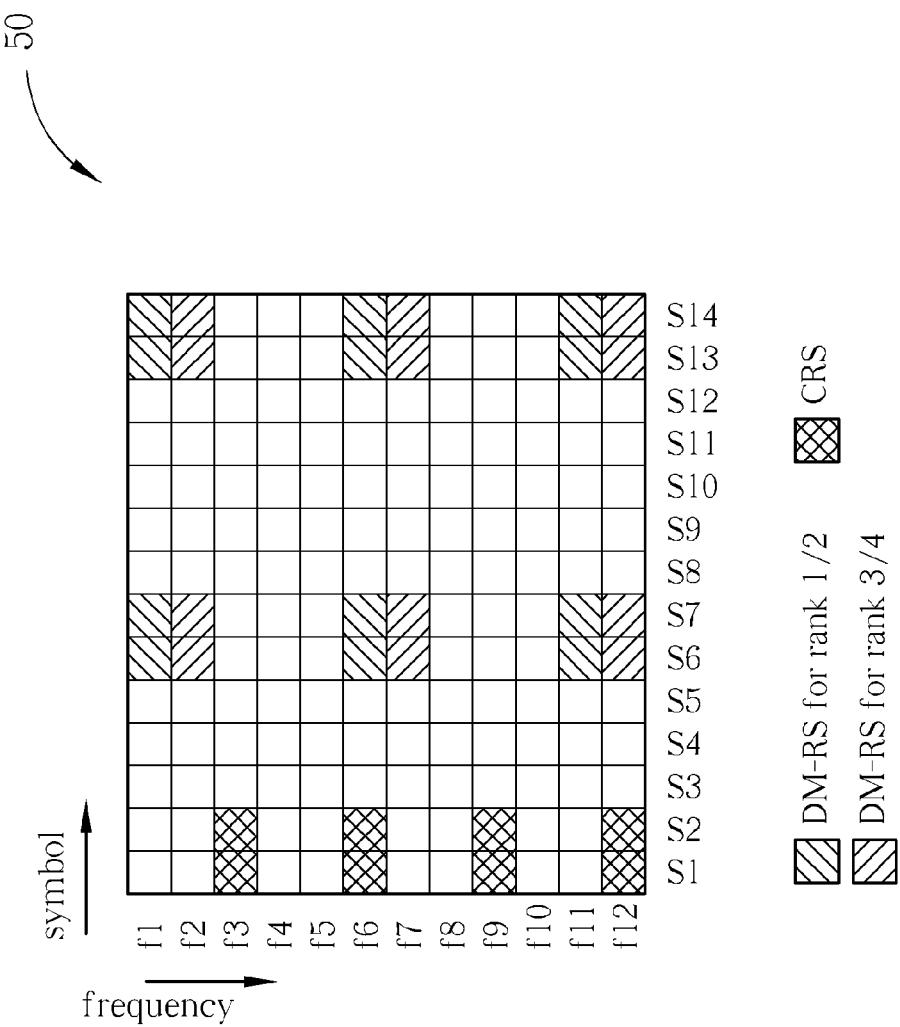

Please refer to FIG. 5, which is an exemplary reference signal pattern 50 in the case of the normal cyclic prefix length. In the reference signal pattern 50, the CRSs are occupied the resource elements on symbols S1 and S2 over subcarriers f3, f6, f9, f12. The DMRSs are occupied the resource elements on symbols S6, S7, S13 and S14 over subcarriers f1, f2, f6, f7, f11 and f12. Therefore, the network transmits the CRSs and DMRSs for channel estimation according to the reference signal pattern 50. Accordingly, the UE receives the CRSs and DMRSs for decoding control signals and data. According to the reference signal pattern 50, the overhead may be reduced to 11.90% for Rank1/2 and 19.05% for Rank3/4.

Figure 6:
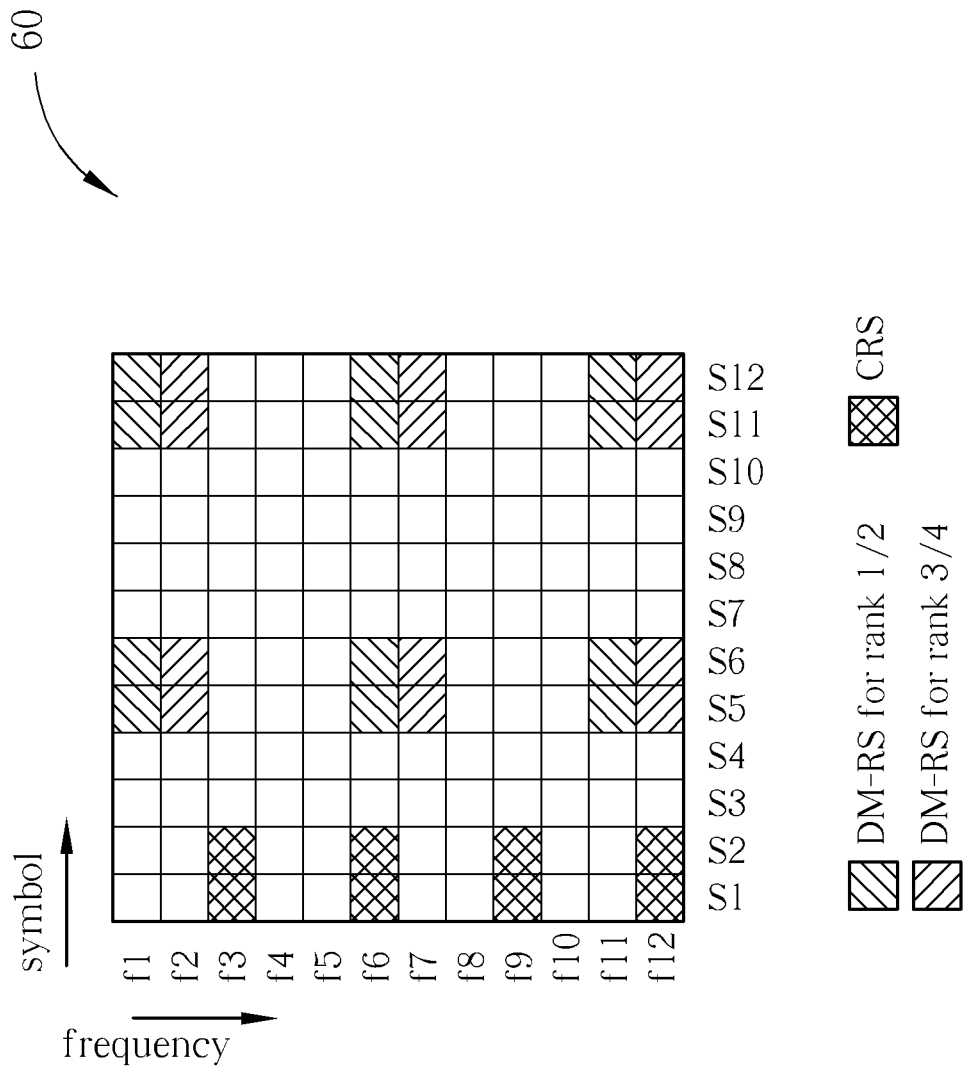

Please refer to FIG. 6, which is an exemplary reference signal pattern 60 in the case of the extended cyclic prefix length. In the reference signal pattern 60, the CRSs are occupied the resource elements on symbols S1 and S2 over subcarriers f3, f6, f9, f12. The DMRSs are occupied the resource elements on symbols S5, S6, S11 and S12 over subcarriers f1, f2, f6, f7, f11 and f12. Therefore, the network transmits the CRSs and DMRSs for channel estimation according to the reference signal pattern 60. Accordingly, the UE receives the CRSs and DMRSs for decoding control signals and data. According to the reference signal pattern 60, the overhead may be reduced to 13.89% for Rank1/2 and 22.22% for Rank3/4.

Figure 7:
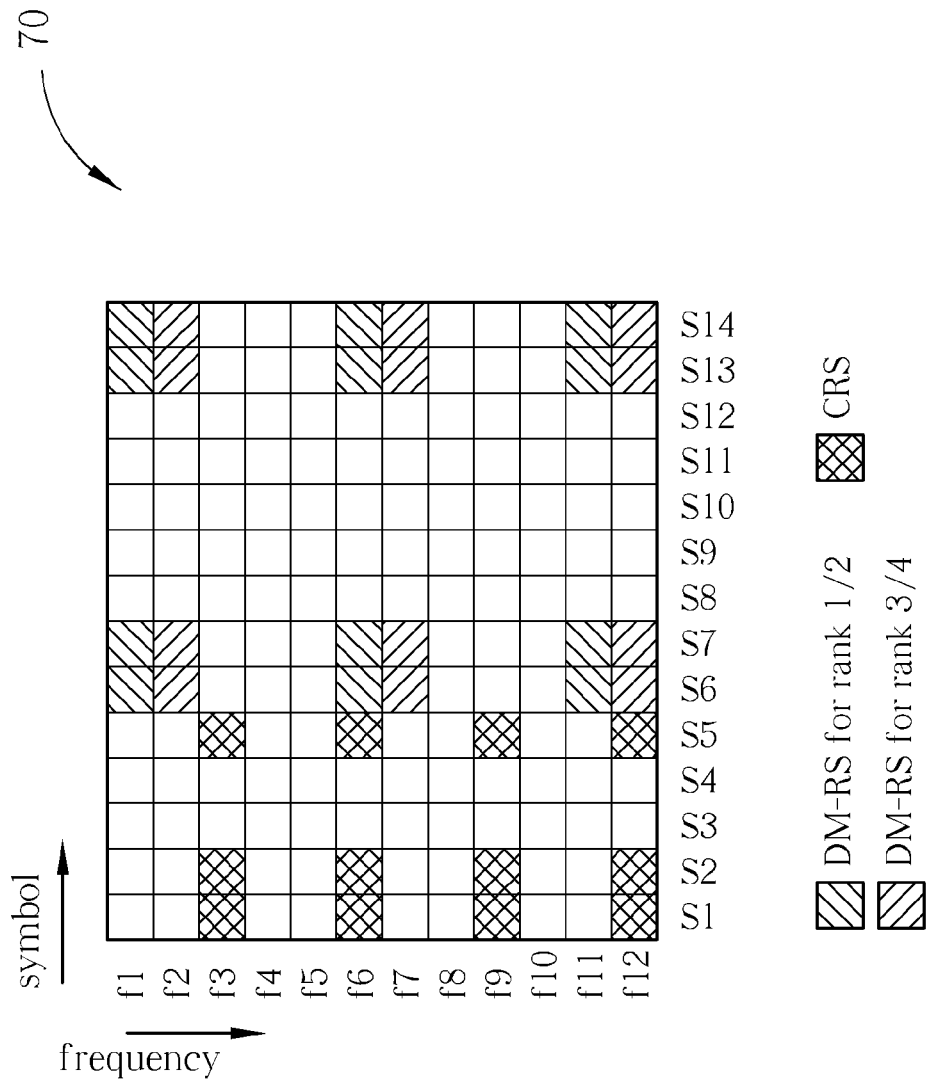

For more accurate channel estimation, a set C2 of the CRSs may be allocated to a set RE2 of the resource elements on the symbol S5 over the subcarriers S3, S6, S9 and S12 in the case of the normal cyclic prefix length, or on the symbol S4 over the subcarriers S3, S6, S9 and S12 in the case of the extended cyclic prefix. Please refer to FIG. 7, which is an exemplary reference signal pattern 70 in the case of the normal cyclic prefix length. In the reference signal pattern 70, the CRSs are occupied the resource elements on symbols S1, S2 and S5 over subcarriers f3, f6, f9, f12. The DMRSs are occupied the resource elements on symbols S6, S7, S13 and S14 over subcarriers f1, f2, f6, f7, f11 and f12. Therefore, the network transmits the CRSs and DMRSs for channel estimation according to the reference signal pattern 70. Accordingly, the UE receives the CRSs and DMRSs for decoding control signals and data. According to the reference signal pattern 70, the overhead may be reduced to 14.28% for Rank1/2 and 21.43% for Rank3/4.

Figure 8:
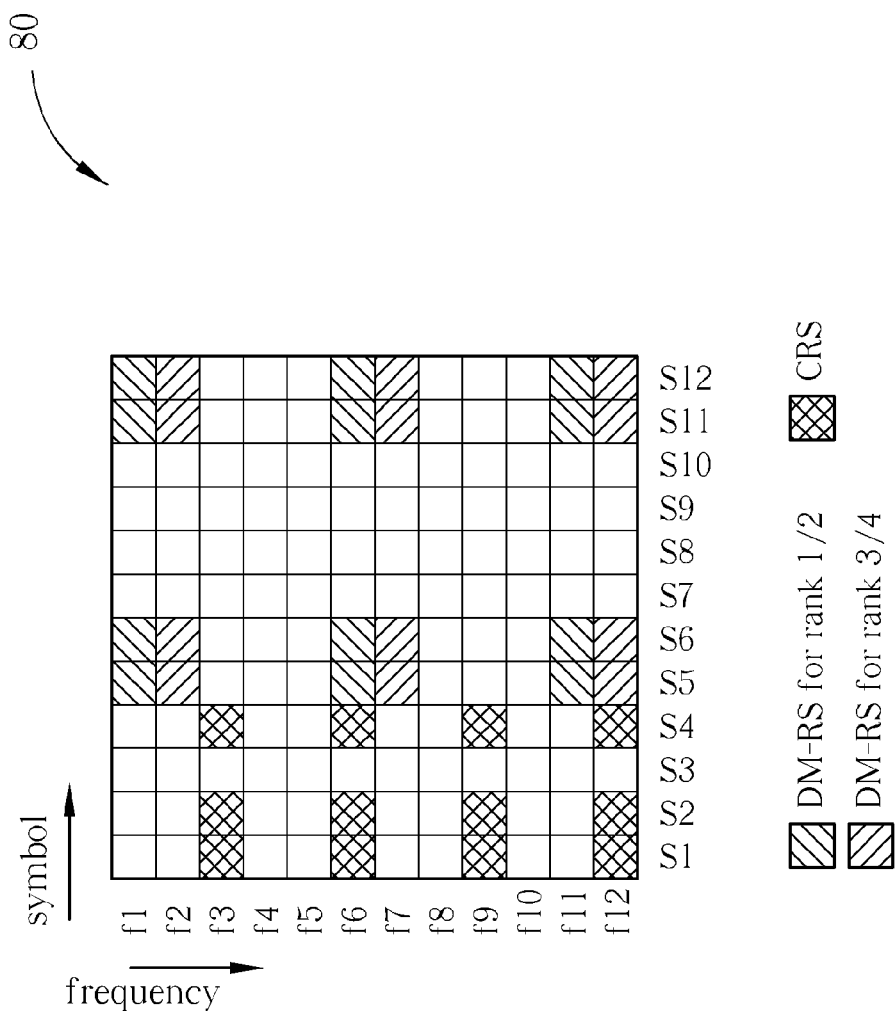

Please refer to FIG. 8, which is an exemplary reference signal pattern 80 in the case of the extended cyclic prefix length. In the reference signal pattern 80, the CRSs are occupied the resource elements on symbols S1, S2 and S4 over subcarriers f3, f6, f9, f12. The DMRSs are occupied the resource elements on symbols S5, S6, S11 and S12 over subcarriers f1, f2, f6, f7, f11 and f12. Therefore, the network transmits the CRSs and DMRSs for channel estimation according to the reference signal pattern 80. Accordingly, the UE receives the CRSs and DMRSs for decoding control signals and data. According to the reference signal pattern 80, the overhead may be reduced to 16.67% for Rank1/2 and 25% for Rank3/4.

Figure 9:
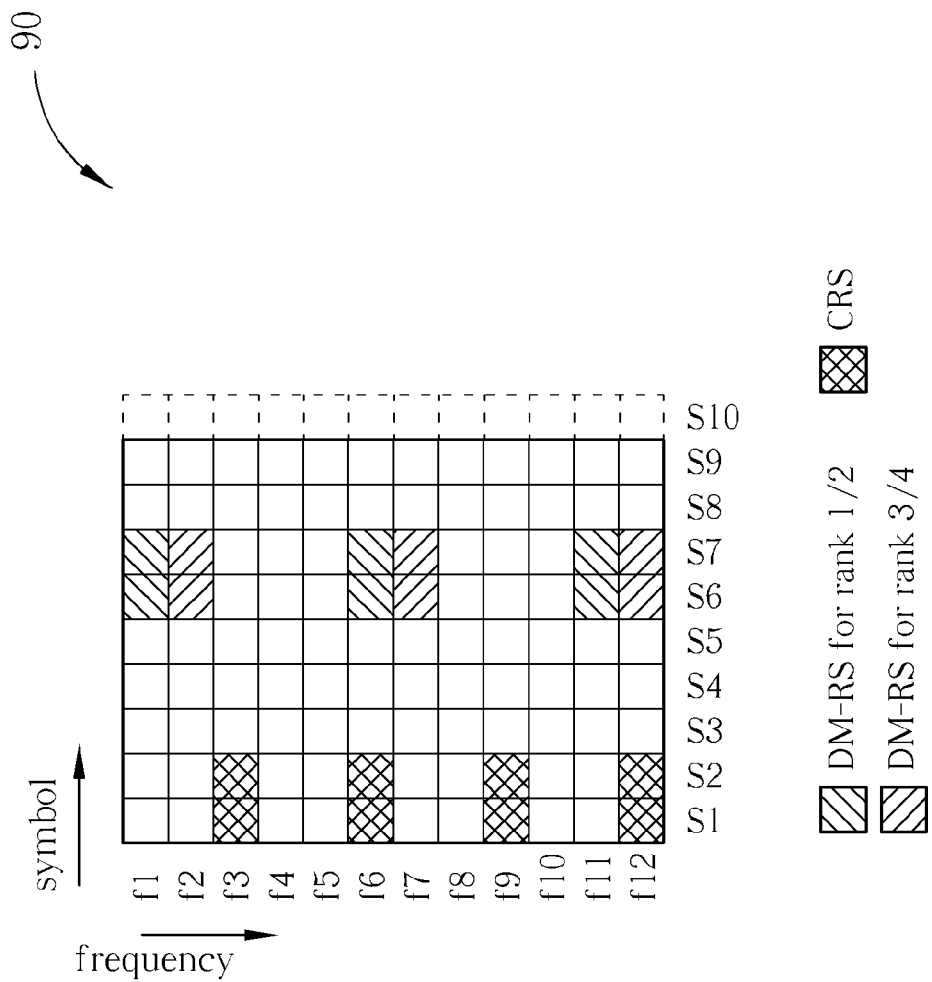

If the subframe consists of a downlink pilot timeslot (DwPTS), then a reference signal pattern can be designed according to the process 40. Please refer to FIG. 9, which is an exemplary reference signal pattern 90 for DwPTS with 9/10 symbols. In the reference signal pattern 90, the CRSs are occupied the resource elements on symbols S1 and S2 over subcarriers f3, f6, f9, f12. The DMRSs are occupied the resource elements on symbols S6 and S7 over subcarriers f1, f2, f6, f7, f11 and f12. Therefore, the network transmits the CRSs and DMRSs for channel estimation according to the reference signal pattern 90.

Figure 10:
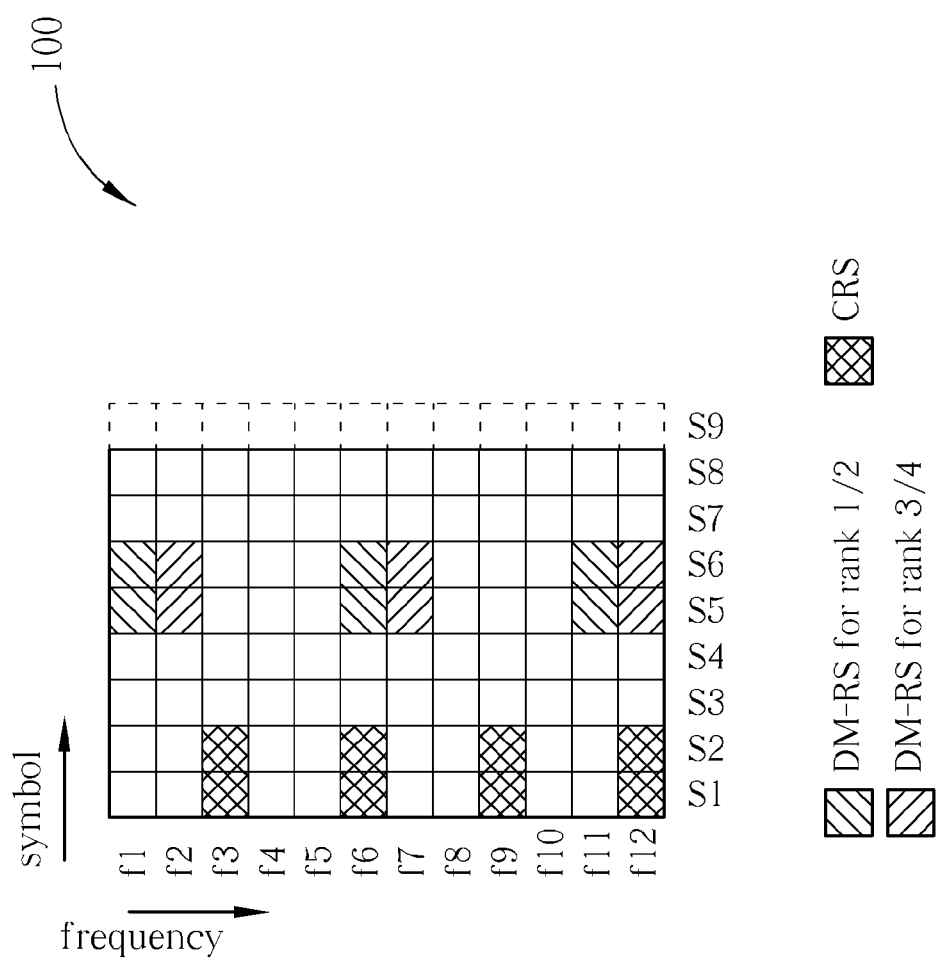

Please refer to FIG. 10, which is an exemplary reference signal pattern 100 for DwPTS with 8/9 symbols. In the reference signal pattern 100, the CRSs are occupied the resource elements on symbols S1 and S2 over subcarriers f3, f6, f9, f12. The DMRSs are occupied the resource elements on symbols S5 and S6 over subcarriers f1, f2, f6, f7, f11 and f12. Therefore, the network transmits the CRSs and DMRSs for channel estimation according to the reference signal pattern 100.

Figure 11:
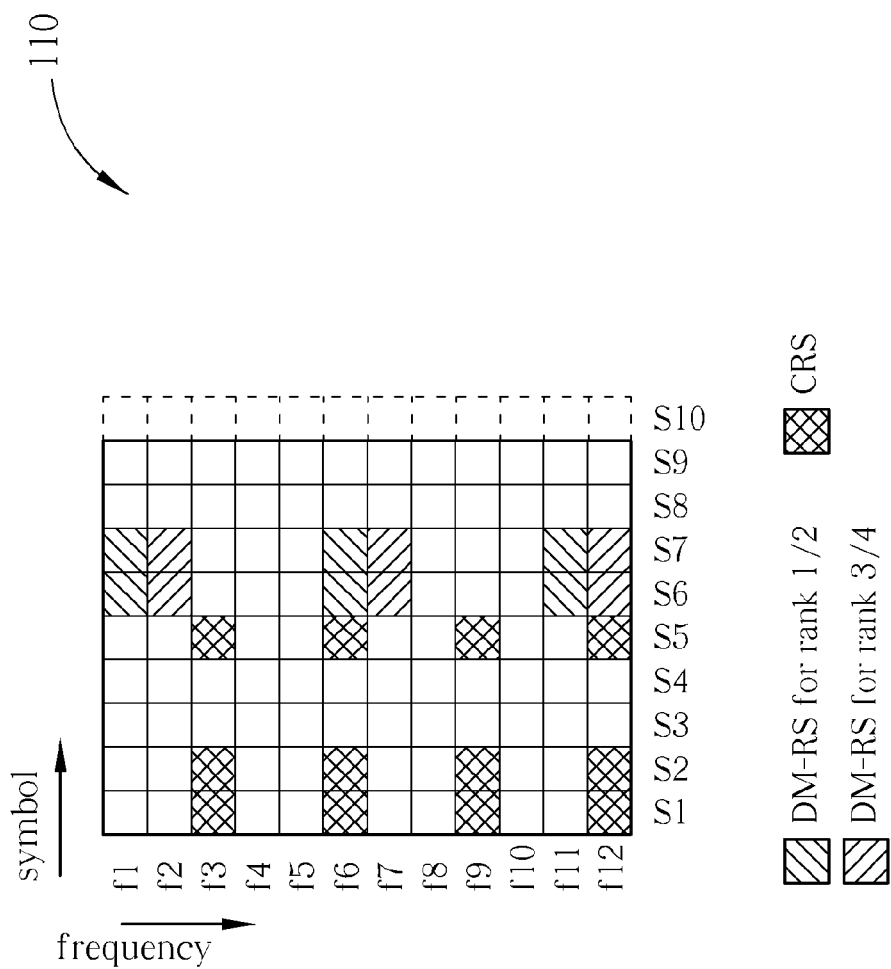

For more accurate channel estimation, the set C2 of the CRSs may be allocated to the set RE2 of the resource elements on the symbol S5 over the subcarriers f3, f6, f9 and f12 in the case of the DwPTS with 9/10 symbols, or on the symbol S4 over the subcarriers f3, f6, f9 and f12 in the case of the DwPTS with 8/9 symbols. Please refer to FIG. 11, which is an exemplary reference signal pattern 110 for DwPTS with 9/10 symbols. In the reference signal pattern 110, the CRSs are occupied the resource elements on symbols S1, S2 and S5 over subcarriers f3, f6, f9, f12. The DMRSs are occupied the resource elements on symbols S6 and S7 over subcarriers f1, f2, f6, f7, f11 and f12. Therefore, the network transmits the CRSs and DMRSs for channel estimation according to the reference signal pattern 110. Accordingly, the UE receives the CRSs and DMRSs for decoding control signals and data.

Figure 12:
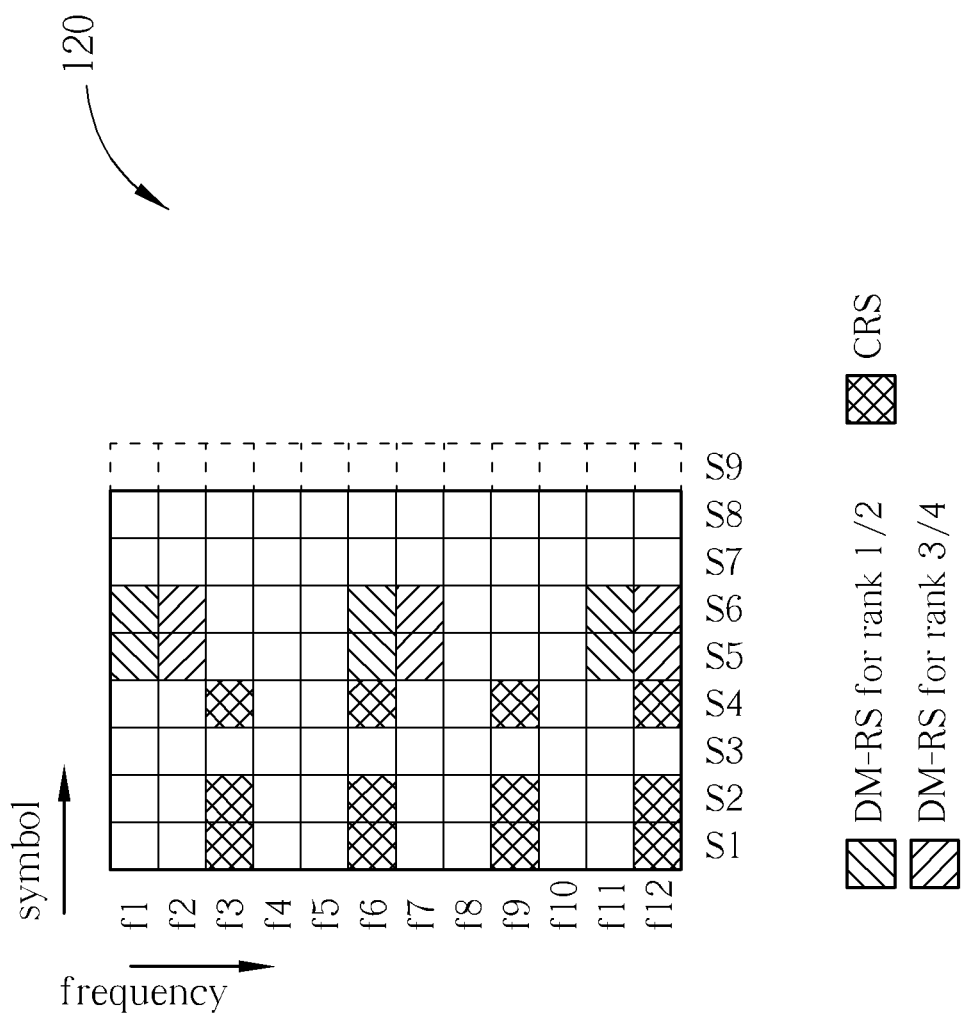

Please refer to FIG. 12, which is an exemplary reference signal pattern 120 for DwPTS with 8/9 symbols. In the reference signal pattern 120, the CRSs are occupied the resource elements on symbols S1, S2 and S4 over subcarriers f3, f6, f9, f12. The DMRSs are occupied the resource elements on symbols S5 and S6 over subcarriers f1, f2, f6, f7, f11 and f12. Therefore, the network transmits the CRSs and DMRSs for channel estimation according to the reference signal pattern 120. Accordingly, the UE receives the CRSs and DMRSs for decoding control signals and data.

Figure 13:
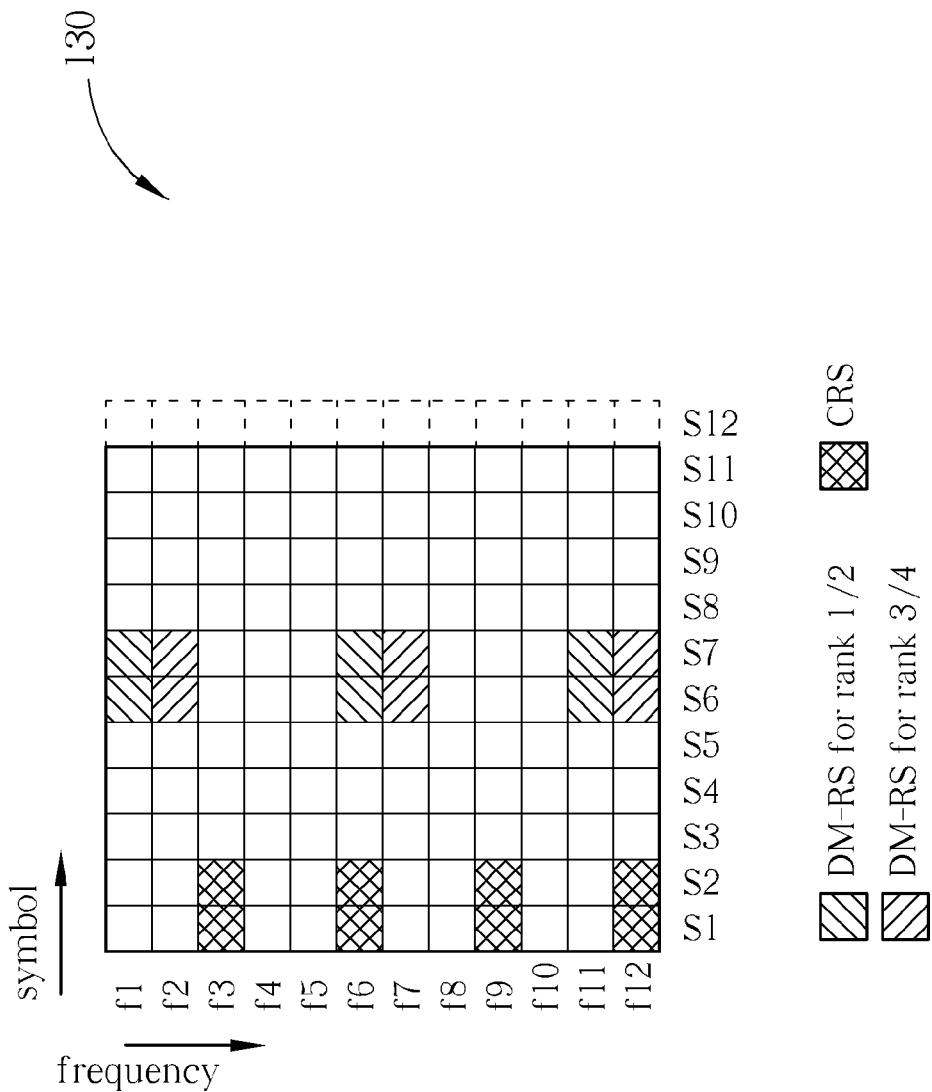

Please refer to FIG. 13, which is an exemplary reference signal pattern 130 for DwPTS with 11/12 symbols. In the reference signal pattern 130, the CRSs are occupied the resource elements on symbols S1 and S2 over subcarriers f3, f6, f9, f12. The DMRSs are occupied the resource elements on symbols S6 and S7 over subcarriers f1, f2, f6, f7, f11 and f12. Therefore, the network transmits the CRSs and DMRSs for channel estimation according to the reference signal pattern 130.

Figure 14:
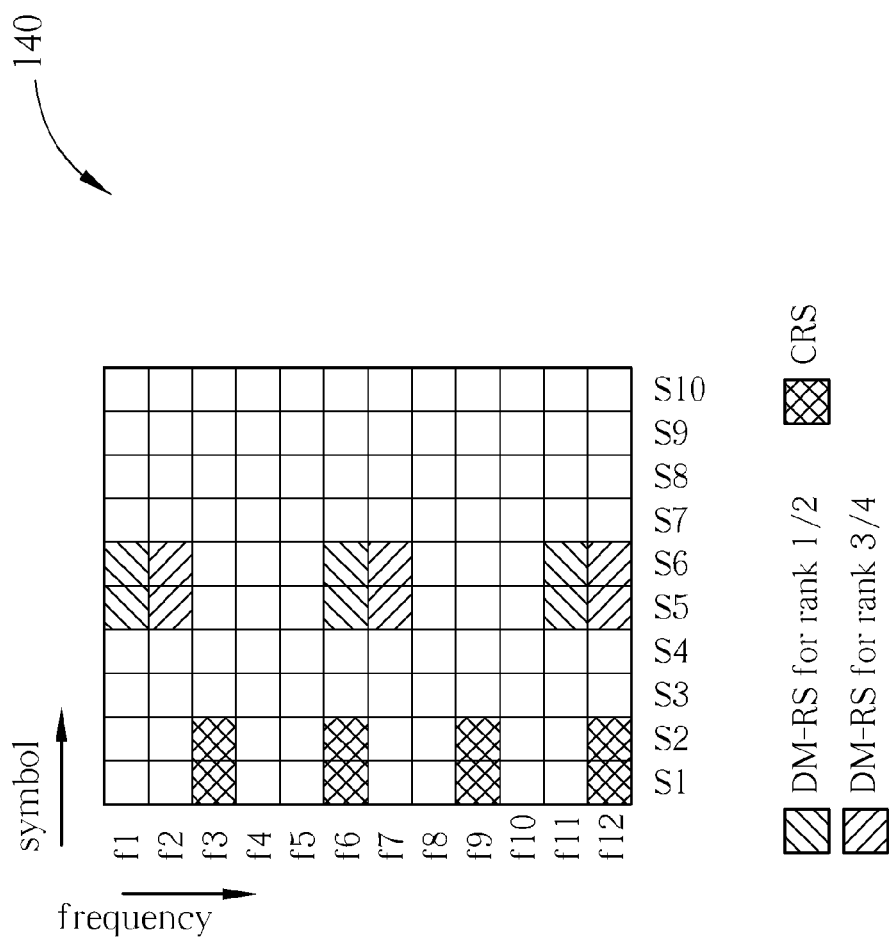

Please refer to FIG. 14, which is an exemplary reference signal pattern 140 for DwPTS with 10 symbols. In the reference signal pattern 140, the CRSs are occupied the resource elements on symbols S1 and S2 over subcarriers f3, f6, f9, f12. The DMRSs are occupied the resource elements on symbols S5 and S6 over subcarriers f1, f2, f6, f7, f11 and f12. Therefore, the network transmits the CRSs and DMRSs for channel estimation according to the reference signal pattern 140.

Figure 15:
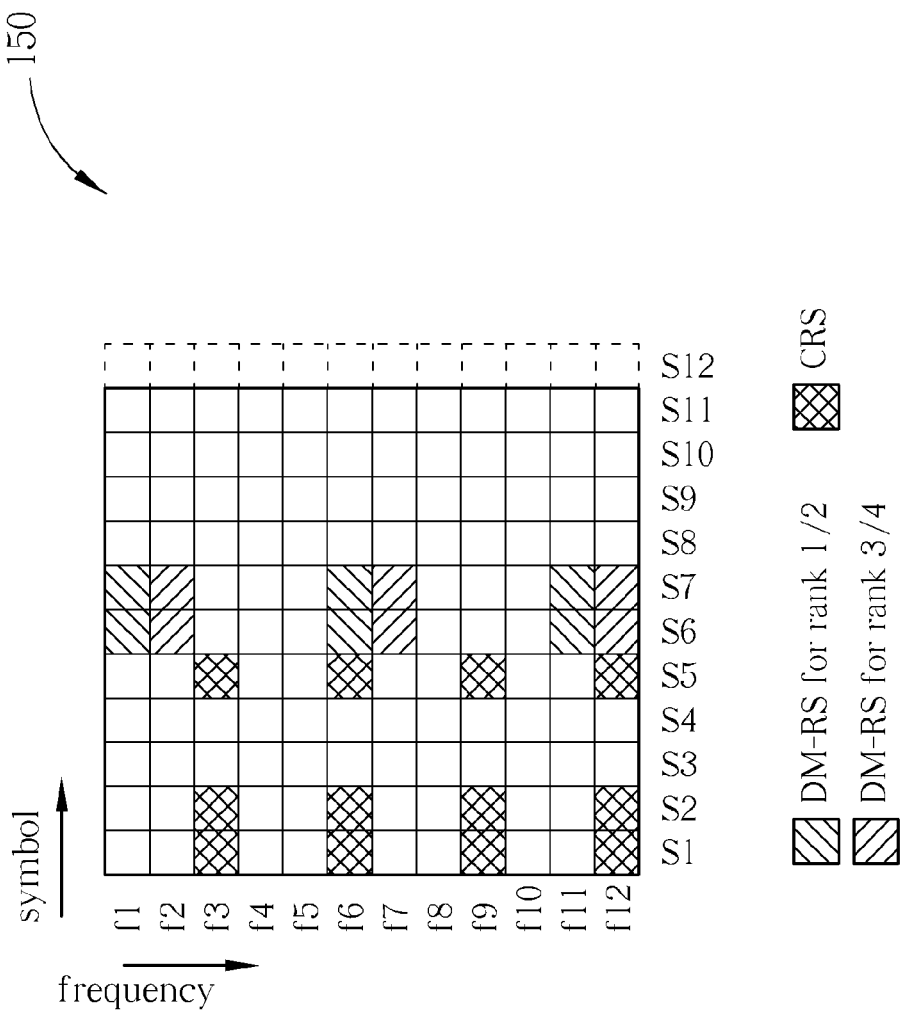

For more accurate channel estimation, the set C2 of the CRSs may be allocated to the set RE2 of the resource elements on the symbol S5 over the subcarriers f3, f6, f9 and f12 in the case of the DwPTS with 11/12 symbols, or on the symbol S4 over the subcarriers f3, f6, f9 and f12 in the case of the DwPTS with 10 symbols. Please refer to FIG. 15, which is an exemplary reference signal pattern 150 for DwPTS with 11/12 symbols. In the reference signal pattern 150, the CRSs are occupied the resource elements on symbols S1, S2 and S5 over subcarriers f3, f6, f9, f12. The DMRSs are occupied the resource elements on symbols S6 and S7 over subcarriers f1, f2, f6, f7, f11 and f12. Therefore, the network transmits the CRSs and DMRSs for channel estimation according to the reference signal pattern 150. Accordingly, the UE receives the CRSs and DMRSs for decoding control signals and data.

Figure 16:
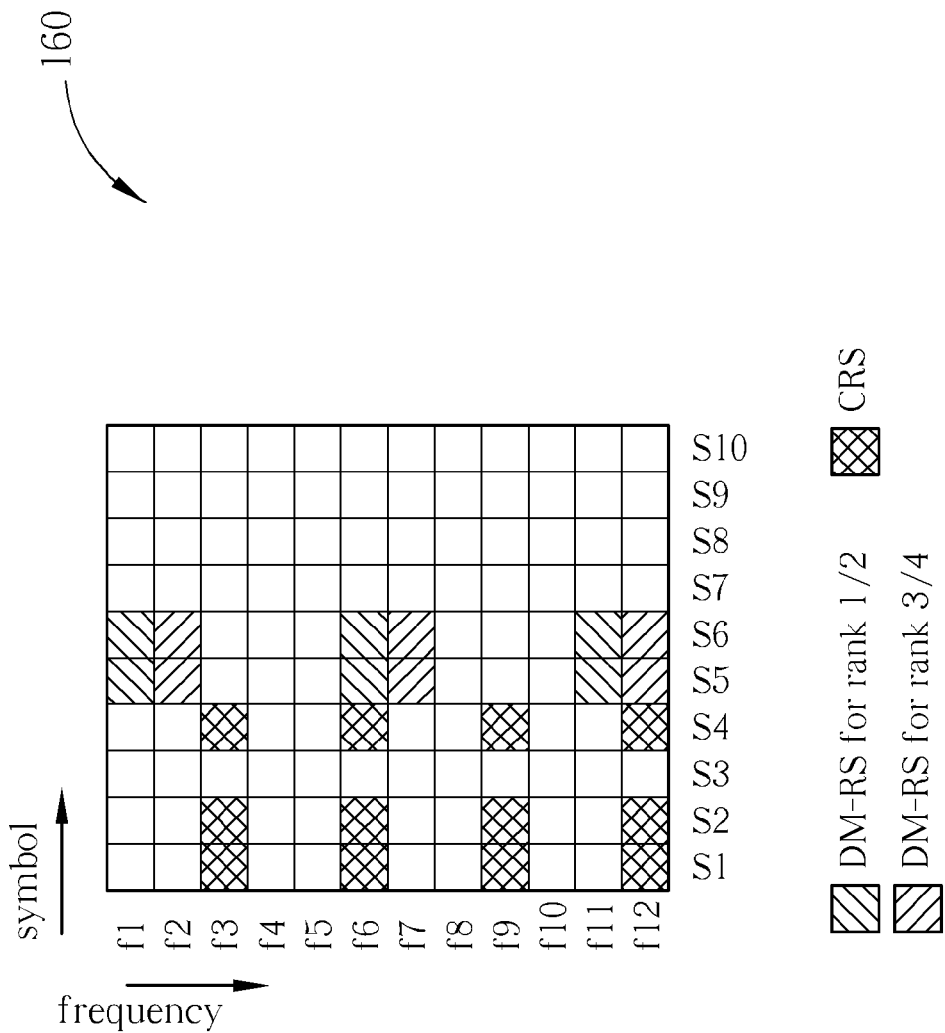

Please refer to FIG. 16, which is an exemplary reference signal pattern 120 for DwPTS with 10 symbols. In the reference signal pattern 160, the CRSs are occupied the resource elements on symbols S1, S2 and S4 over subcarriers f3, f6, f9, f12. The DMRSs are occupied the resource elements on symbols S5 and S6 over subcarriers f1, f2, f6, f7, f11 and f12. Therefore, the network transmits the CRSs and DMRSs for channel estimation according to the reference signal pattern 160. Accordingly, the UE receives the CRSs and DMRSs for decoding control signals and data.

Figure 17:
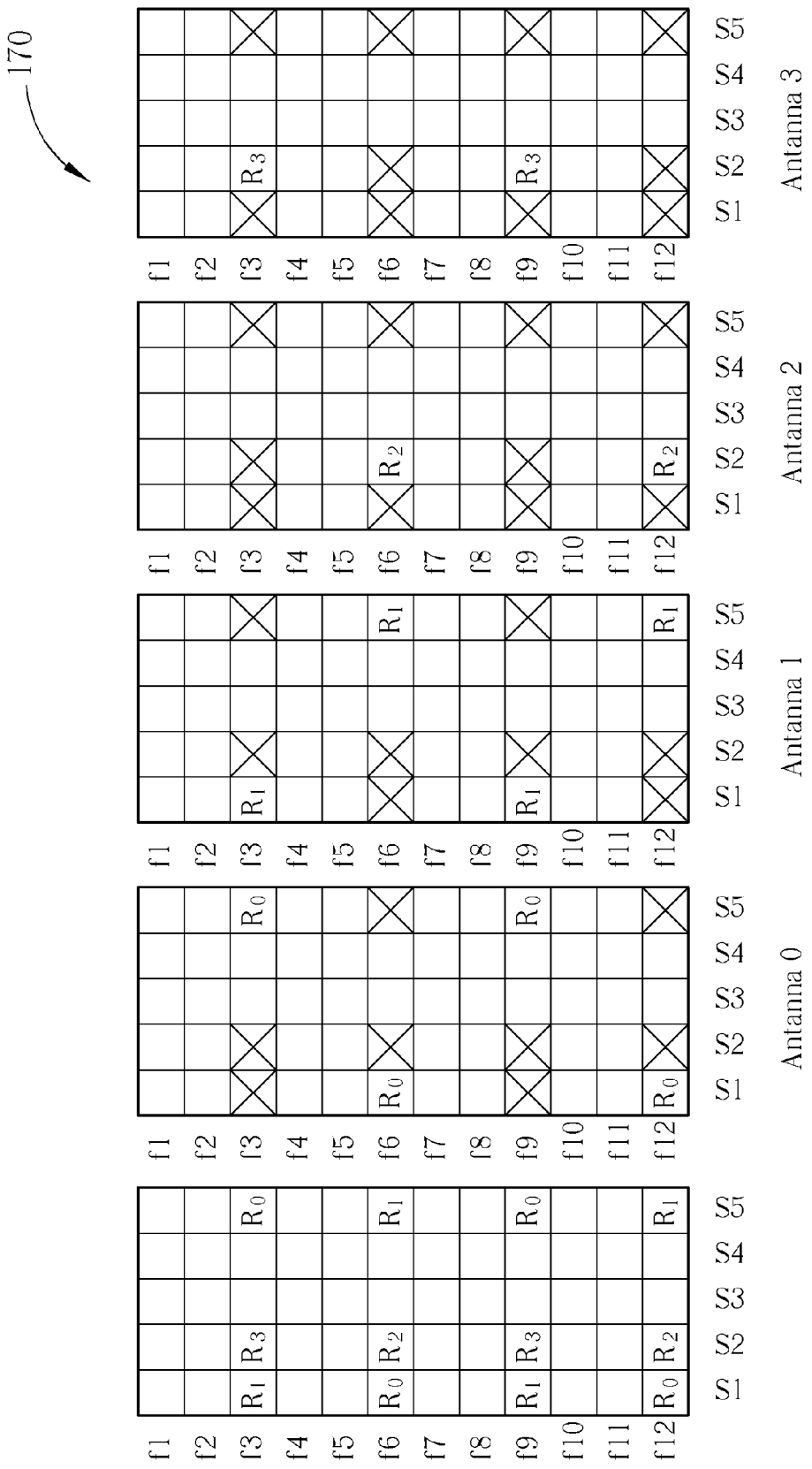

The wireless communication system 10 may be designed to work with multiple transmit antennas. An antenna port may in practice be implemented either as a single physical transmit antenna or as a combination of multiple physical antenna elements. The transmitted CRSs corresponding to a given antenna port enables the UE to derive channel estimation for that antenna port. Up to four cell-specific antenna ports may be used by the network, thus requiring the UE to derive up to four separate channel estimation. Please refer to FIG. 17, which is an exemplary reference signal pattern 170 for four antenna ports. For simplicity, only resource elements occupied by the CRSs are shown. As seen in FIG. 17, an antenna port 0 occupies the resource elements on the symbol S1 over the subcarriers f6 and f12, and the symbol S5 over the subcarriers f3 and f9. An antenna port 1 occupies the resource elements on the symbol S1 over the subcarriers f3 and f9, and the symbol S5 over the subcarriers f6 and f12. An antenna port 2 occupies the resource elements on the symbol S2 over the subcarriers f6 and f12. An antenna port 3 occupies the symbol S2 over the subcarriers f3 and f9.

Figure 18:
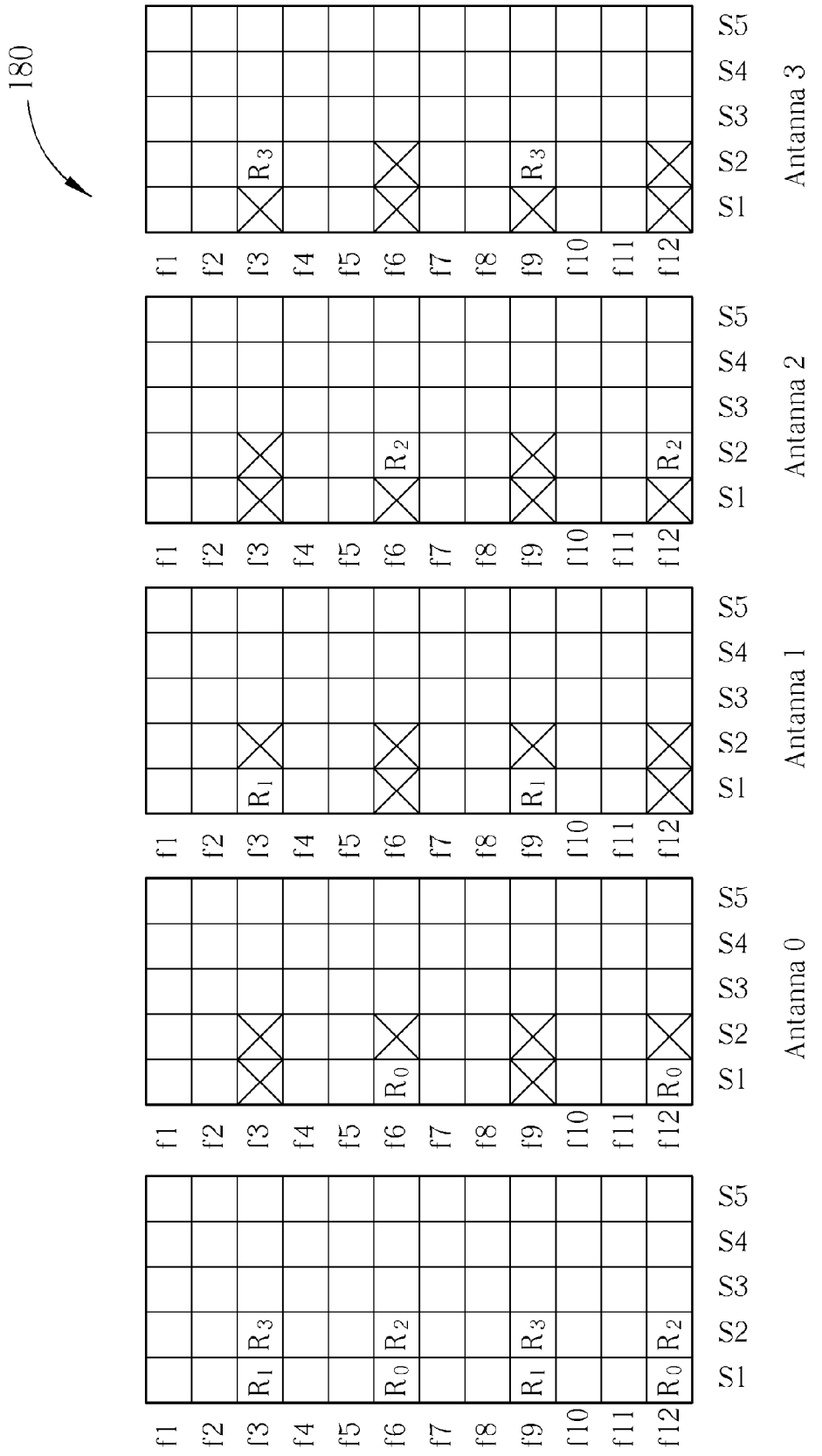

Please refer to FIG. 18, which is another reference signal pattern 180 for four antenna ports. For simplicity, only resource elements occupied by the CRSs are shown. As seen in FIG. 18, an antenna port 0 occupies the resource elements on the symbol S1 over the subcarriers f6 and f12. An antenna port 1 occupies the resource elements on the symbol S1 over the subcarriers f3 and f9. An antenna port 2 occupies the resource elements on the symbol S2 over the subcarriers f6 and f12. An antenna port 3 occupies the symbol S2 over the subcarriers f3 and f9.

Figure 19:
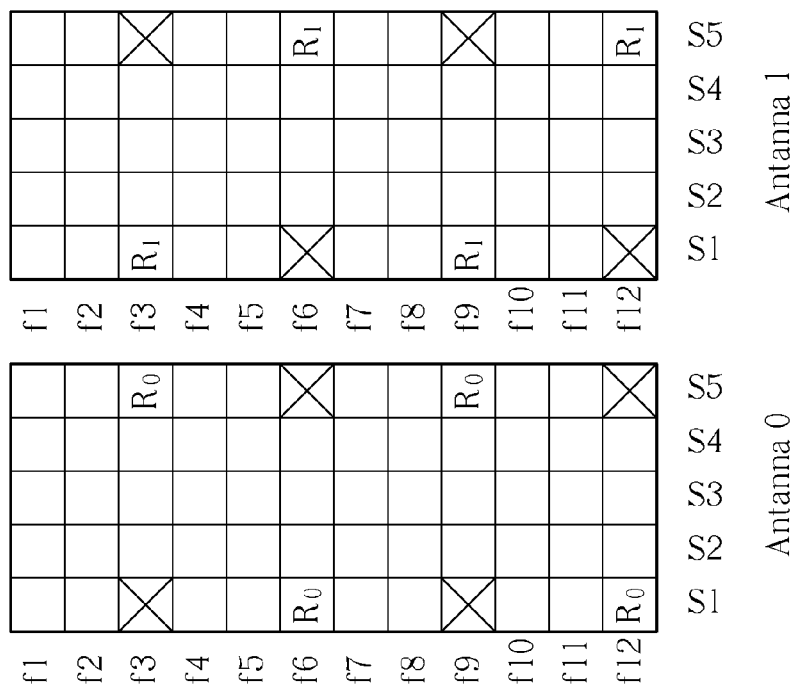

Please refer to FIG. 19, which is an exemplary reference signal pattern 190 for two antenna ports. For simplicity, only resource elements occupied by the CRSs are shown. As seen in FIG. 19, an antenna port 0 occupies the resource elements on the symbol S1 over the subcarriers f6 and f12 and the symbol S5 over the subcarriers f3 and f9. An antenna port 1 occupies the resource elements on the symbol S1 over the subcarriers f3 and f9, and the symbol S5 over the subcarriers f6 and f12.

Figure 20:
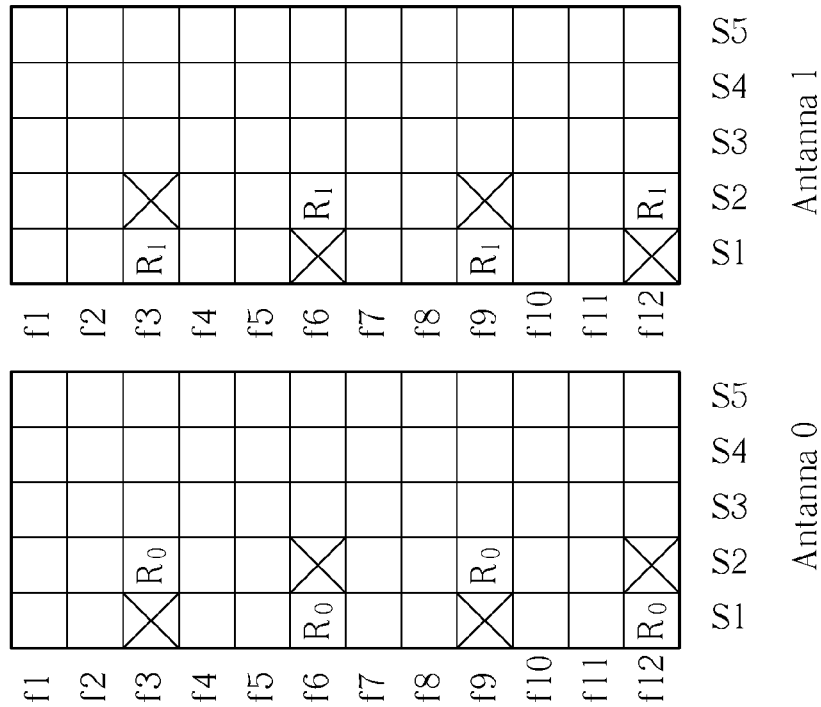

Please refer to FIG. 20, which is an exemplary reference signal pattern 200 for two antenna ports. For simplicity, only resource elements occupied by the CRSs are shown. As seen in FIG. 20, an antenna port 0 occupies the resource elements on the symbol S1 over the subcarriers f6 and f12 and the symbol S2 over the subcarriers f3 and f9. An antenna port 1 occupies the resource elements on the symbol S1 over the subcarriers f3 and f9, and the symbol S2 over the subcarriers f6 and f12.

Figure 21:
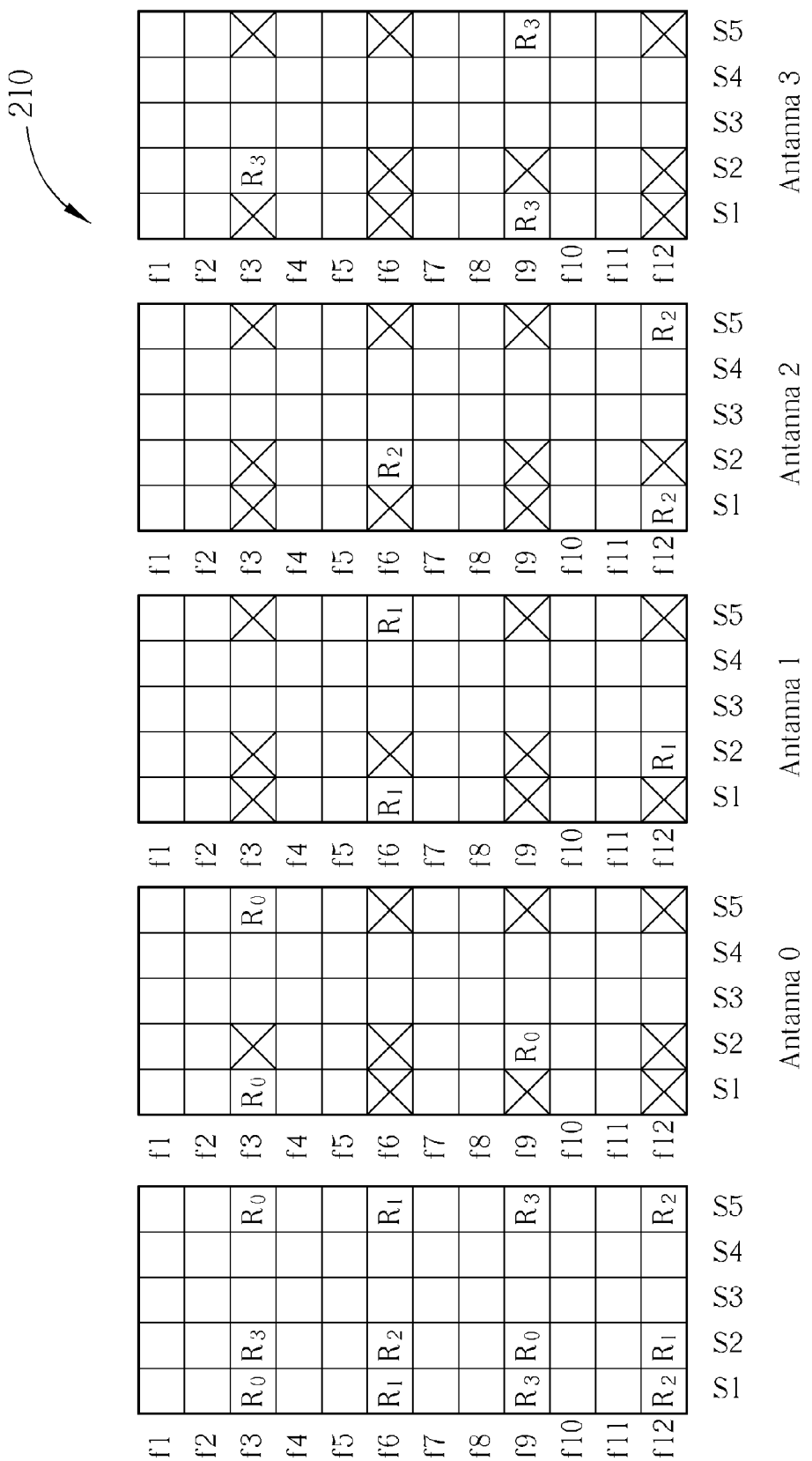

Please refer to FIG. 21, which is another reference signal pattern 210 for four antenna ports. For simplicity, only resource elements occupied by the CRSs are shown. As seen in FIG. 21, an antenna port 0 occupies the resource elements on the symbol S1 over the subcarrier f3, the symbol S2 over the subcarrier f9 and the symbol S5 over the subcarrier f3. An antenna port 1 occupies the resource elements on the symbol S1 over the subcarrier f6, the symbol S2 over the subcarrier f12 and the symbol S5 over the subcarrier f6. An antenna port 2 occupies the resource elements on the symbol S1 over the subcarrier f12, the symbol S2 over the subcarrier f6 and the symbol S5 over the subcarrier f12. An antenna port 3 occupies the symbol S1 over the subcarrier f9, the symbol S2 over the subcarrier f3 and the symbol S5 over the subcarrier f9.

Figure 22:
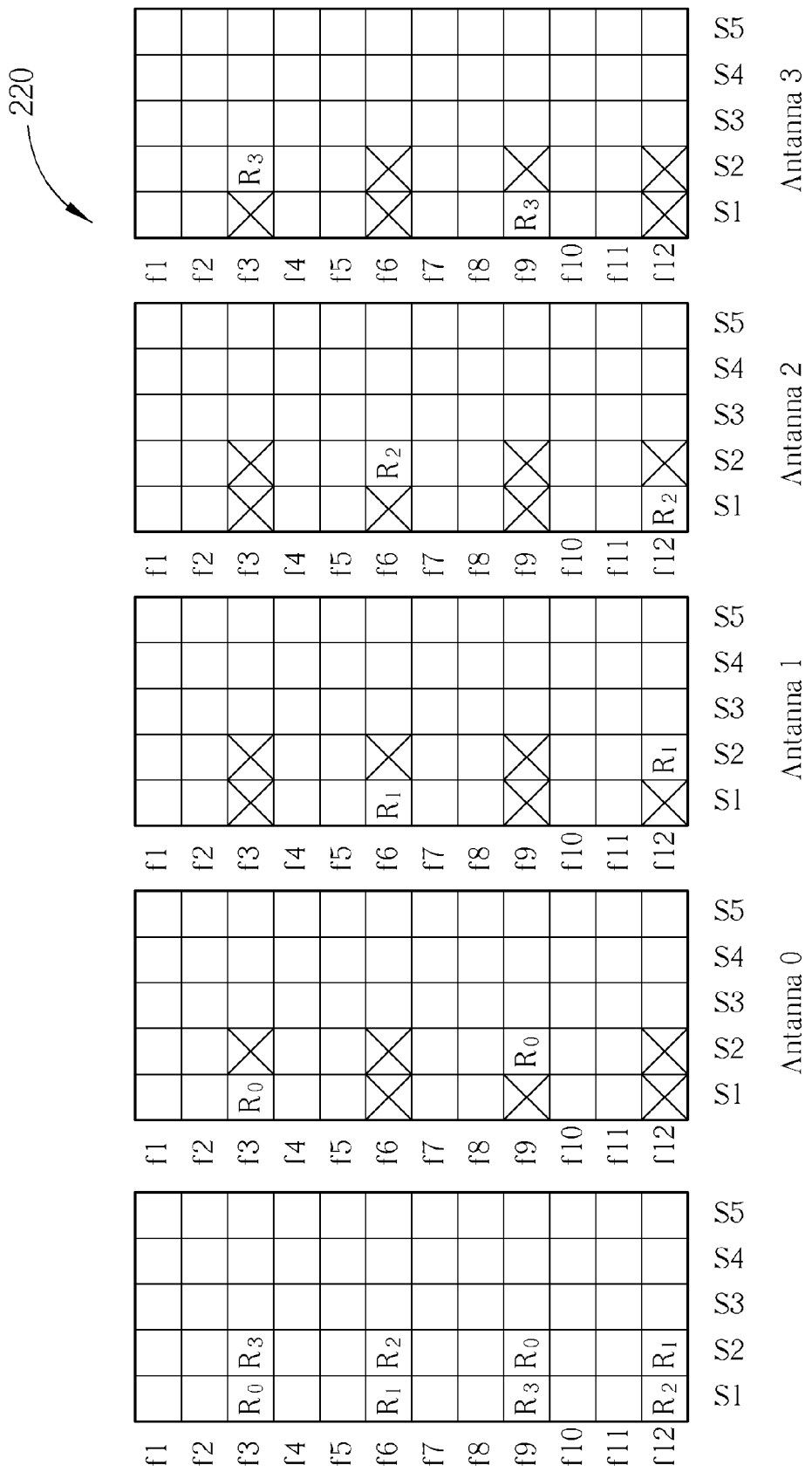

Please refer to FIG. 22, which is another reference signal pattern 220 for four antenna ports. For simplicity, only resource elements occupied by the CRSs are shown. As seen in FIG. 22, an antenna port 0 occupies the resource elements on the symbol S1 over the subcarrier f3 and the symbol S2 over the subcarrier f9. An antenna port 1 occupies the resource elements on the symbol S1 over the subcarrier f6 and the symbol S2 over the subcarrier f12. An antenna port 2 occupies the resource elements on the symbol S1 over the subcarriers f12 and the symbol S2 over the subcarrier f6. An antenna port 3 occupies the symbol S1 over the subcarrier f9 and the symbol S2 over the subcarrier f3.

Figure 23:
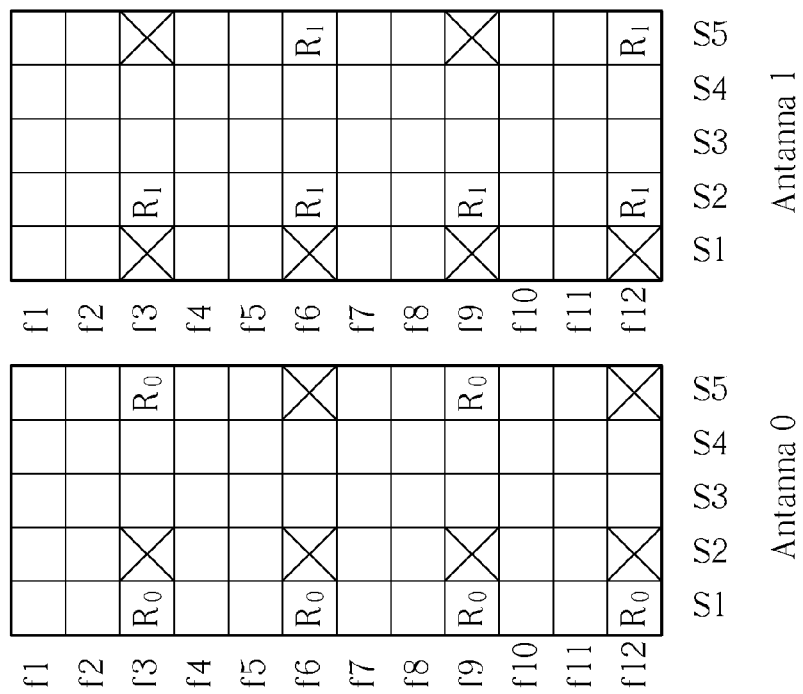

Please refer to FIG. 23, which is an exemplary reference signal pattern 230 for two antenna ports. For simplicity, only resource elements occupied by the CRSs are shown. As seen in FIG. 23, an antenna port 0 occupies the resource elements on the symbol S1 over the subcarriers f3, f6, f9 and f12, and the symbol S5 over the subcarriers f3 and f9. An antenna port 1 occupies the resource elements on the symbol S2 over the subcarriers f3, f6, f9 and f12 and the symbol S5 over the subcarriers f6 and f12.

Figure 24:
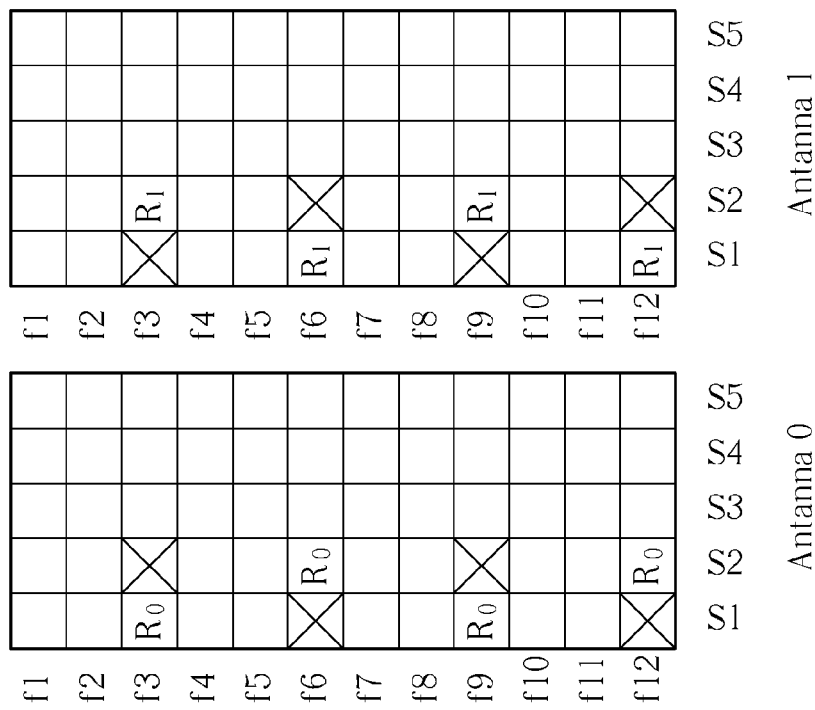

Please refer to FIG. 24, which is an exemplary reference signal pattern 240 for two antenna ports. As seen in FIG. 24, an antenna port 0 occupies the resource elements on the symbol S1 over the subcarriers f3 and f9 and the symbol S2 over the subcarriers f6 and f12. An antenna port 1 occupies the resource elements on the symbol S1 over the subcarriers f6 and f12 and the symbol S2 over the subcarriers f3 and f9.

Figure 25:
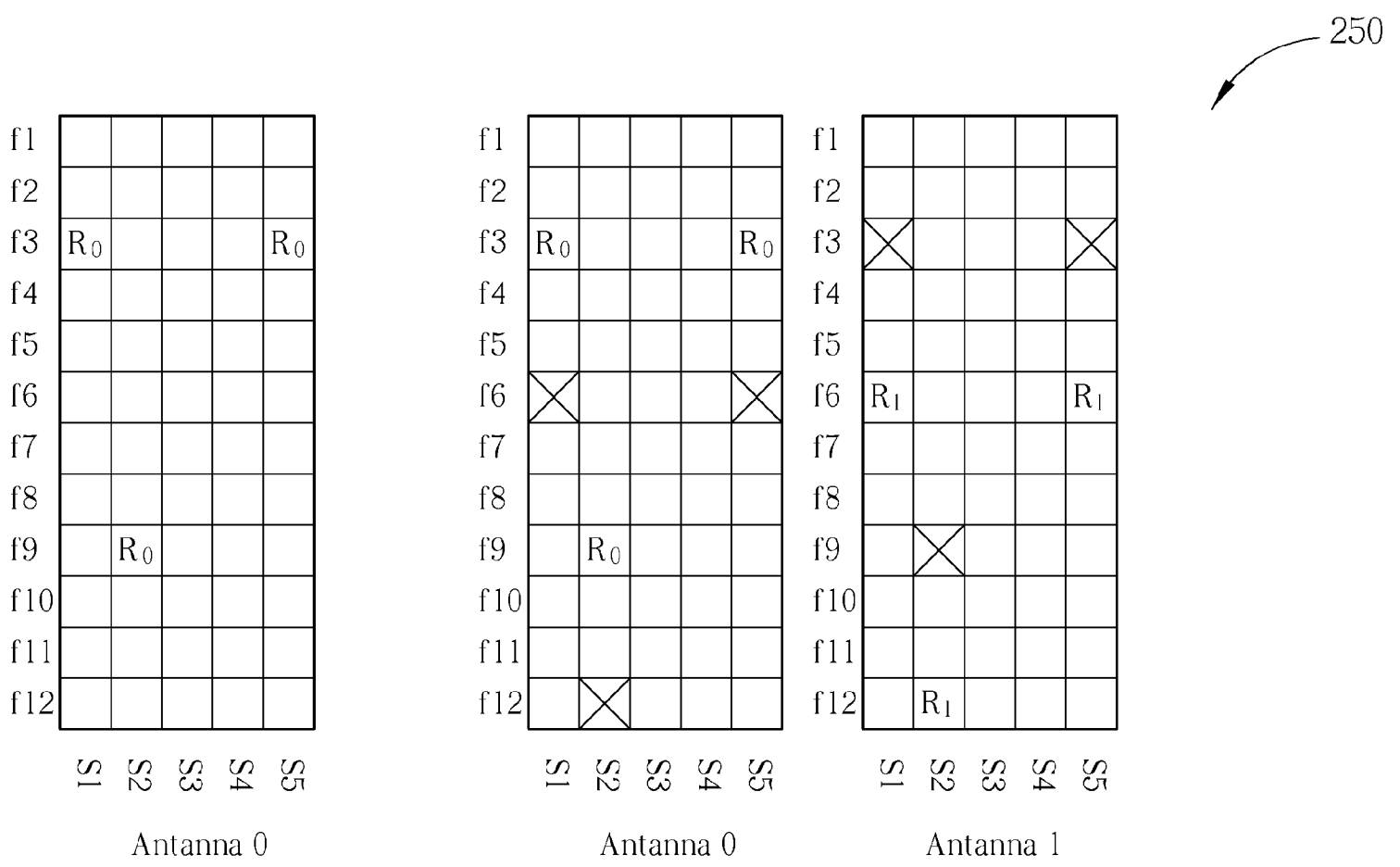

Please refer to FIG. 25, which is an exemplary reference signal pattern 250 for one or two antenna ports. For simplicity, only resource elements occupied by the CRSs are shown. As seen in FIG. 25, for the case of one antenna port, an antenna port 0 occupies the resource elements on the symbol S1 over the subcarrier f3, the symbol S2 over the subcarrier f9 and the symbol S5 over the subcarrier f3. For the case of two antenna ports, in addition to the antenna port 0, an additional antenna port 1 occupies the resource elements on the symbol S1 over the subcarrier f6, the symbol S2 over the subcarrier f12 and the symbol S5 over the subcarrier f6.

Figure 26:
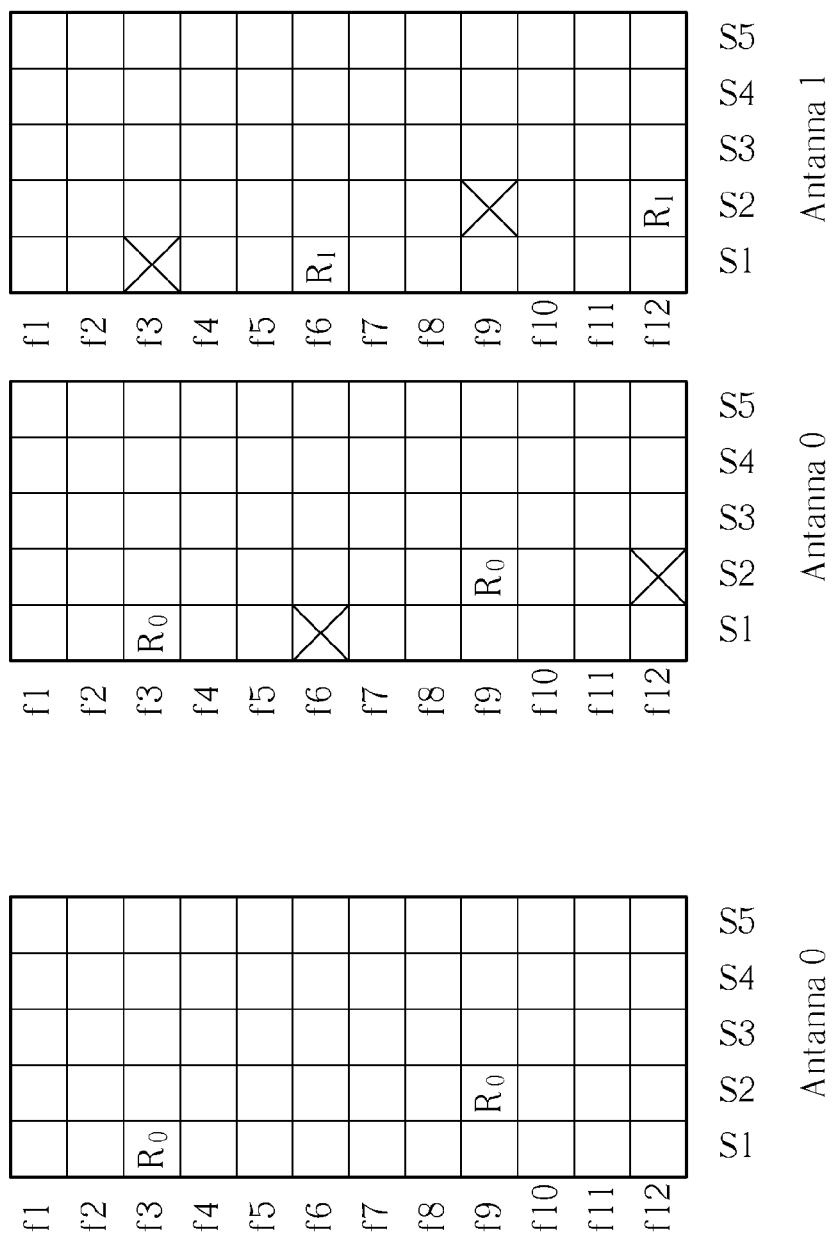

Please refer to FIG. 26, which is an exemplary reference signal pattern 260 for one or two antenna ports. For simplicity, only resource elements occupied by the CRSs are shown. As seen in FIG. 26, for the case of one antenna port, an antenna port 0 occupies the resource elements on the symbol S1 over the subcarrier f3 and the symbol S2 over the subcarrier f9. For the case of two antenna ports, in addition to the antenna port 0, an additional antenna port 1 occupies the resource elements on the symbol S1 over the subcarrier f6 and the symbol S2 over the subcarrier f12.

Please note that the abovementioned steps including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20 in which the processing means 200 processes the program code 214 related to the abovementioned processes and the processed results can enhance uplink transmission in the wireless communications system 10.

To sum up, the examples of the present invention discloses several reference signal patterns to reduce the pilot overhead in wireless communication system (e.g. LTE-A).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of designing a reference signal pattern for a network in a wireless communication system, the method comprising:
   transmitting a plurality of cell-specific reference signal (CRSs) in a subframe, the subframe comprising a plurality of resource elements that are divided in time across a plurality of subcarriers to form a plurality of orthogonal frequency division multiplexed (OFDM) symbols, each of the plurality of resource element occupying a predetermined amount of time on a respective one of the plurality of subcarriers; and
   transmitting a plurality of demodulation reference signal (DMRSs) in the subframe;
   wherein, a first set of the plurality of CRSs is allocated to a first set of the plurality resource elements on a first symbol and a second symbol over a third subcarrier, a sixth subcarrier, a ninth subcarrier and a twelfth subcarrier, and a first set of the plurality of DMRSs is allocated to a third set of the plurality resource elements on a sixth symbol and a seventh symbol over a first subcarrier, a second subcarrier, the sixth subcarrier, a seventh subcarrier, an eleventh subcarrier and the twelfth subcarrier.

2. The method of claim 1, wherein a second set of the plurality of CRSs is allocated to a second set of the plurality resource elements on a fifth symbol over the third subcarrier, the sixth subcarrier, the ninth subcarrier and the twelfth subcarrier.

3. The method of claim 1, wherein the third set of the plurality resource elements further comprises a thirteenth symbol and a fourteenth symbol over the first subcarrier, the second subcarrier, the sixth subcarrier, the seventh subcarrier, the eleventh subcarrier and the twelfth subcarrier.

4. A communication device for designing a reference signal pattern in a wireless communication system, the communication device comprising:
   a storage device for storing a program code corresponding to a process; and a processing device coupled to a non-transitory computer readable recording medium, for processing the program code to execute the process;
   wherein the process comprises:
   transmitting a plurality of cell-specific reference signal (CRSs) in a subframe, the subframe comprising a plurality of resource elements that are divided in time across a plurality of subcarriers to form a plurality of orthogonal frequency division multiplexed (OFDM) symbols, each of the plurality of resource element occupying a predetermined amount of time on a respective one of the plurality of subcarriers; and
   transmitting a plurality of demodulation reference signal (DMRSs) in the subframe;
   wherein, a first set of the plurality of CRSs is allocated to a first set of the plurality resource elements on a first symbol and a second symbol over a third subcarrier, a sixth subcarrier, a ninth subcarrier and a twelfth subcarrier, and a first set of the plurality of DMRSs is allocated to a third set of the plurality resource elements on a sixth symbol and a seventh symbol over a first subcarrier, a second subcarrier, the sixth subcarrier, a seventh subcarrier, an eleventh subcarrier and the twelfth subcarrier.

5. The communication device of claim 4, wherein a second set of the plurality of CRSs is allocated to a second set of the plurality resource elements on a fifth symbol over the third subcarrier, the sixth subcarrier, the ninth subcarrier and the twelfth subcarrier.

6. The communication device of claim 4, wherein the third set of the plurality resource elements further comprises a thirteenth symbol and a fourteenth symbol over the first subcarrier, the second subcarrier, the sixth subcarrier, the seventh subcarrier, the eleventh subcarrier and the twelfth subcarrier.

7. A method of designing reference signal pattern for a mobile device in a wireless communication system, the method comprising:
   receiving a plurality of cell-specific reference signal (CRSs) in a subframe, the subframe comprising a plurality of resource elements that are divided in time across a plurality of subcarriers to form a plurality of orthogonal frequency division multiplexed (OFDM) symbols, each of the plurality of resource element occupying a predetermined amount of time on a respective one of the plurality of subcarriers; and
   receiving a plurality of demodulation reference signal (DMRSs) in the subframe;
   wherein, a first set of the plurality of CRSs is allocated to a first set of the plurality resource elements on a first symbol and a second symbol over a third subcarrier, a sixth subcarrier, a ninth subcarrier and a twelfth subcarrier, and a first set of the plurality of DMRSs is allocated to a third set of the plurality resource elements on a sixth symbol and a seventh symbol over a first subcarrier, a second subcarrier, the sixth subcarrier, a seventh subcarrier, an eleventh subcarrier and the twelfth subcarrier.

8. The method of claim 7, wherein a second set of the plurality of CRSs is allocated to a second set of the plurality resource elements on a fifth symbol over the third subcarrier, the sixth subcarrier, the ninth subcarrier and the twelfth subcarrier.

9. The method of claim 7, wherein the third set of the plurality resource elements further comprises a thirteenth symbol and a fourteenth symbol over the first subcarrier, the second subcarrier, the sixth subcarrier, the seventh subcarrier, the eleventh subcarrier and the twelfth subcarrier.

10. A communication device for designing a reference signal pattern in a wireless communication system, the communication device comprising:
    a storage device for storing a program code corresponding to a process; and a processing device coupled to a non-transitory computer readable recording medium, for processing the program code to execute the process;
    wherein the process comprises:
    receiving a plurality of cell-specific reference signal (CRSs) in a subframe, the subframe comprising a plurality of resource elements that are divided in time across a plurality of subcarriers to form a plurality of orthogonal frequency division multiplexed (OFDM) symbols, each of the plurality of resource element occupying a predetermined amount of time on a respective one of the plurality of subcarriers;
    receiving a plurality of demodulation reference signal (DMRSs) in the subframe;
    wherein, a first set of the plurality of CRSs is allocated to a first set of the plurality resource elements on a first symbol and a second symbol over a third subcarrier, a sixth subcarrier, a ninth subcarrier and a twelfth subcarrier, and a first set of the plurality of DMRSs is allocated to a third set of the plurality resource elements on a sixth symbol and a seventh symbol over a first subcarrier, a second subcarrier, the sixth subcarrier, a seventh subcarrier, an eleventh subcarrier and the twelfth subcarrier.

11. The communication device of claim 10, wherein a second set of the plurality of CRSs is allocated to a second set of the plurality resource elements on a fifth symbol over the third subcarrier, the sixth subcarrier, the ninth subcarrier and the twelfth subcarrier.

12. The communication device of claim 10, wherein the third set of the plurality resource elements on a thirteenth symbol and a fourteenth symbol over the first subcarrier, the second subcarrier, the sixth subcarrier, the seventh subcarrier, the eleventh subcarrier and the twelfth subcarrier.

13. A method of designing a reference signal pattern for a network in a wireless communication system, the method comprising:
transmitting a plurality of cell-specific reference signal (CRSs) in a subframe, the subframe comprising a plurality of resource elements that are divided in time across a plurality of subcarriers to form a plurality of orthogonal frequency division multiplexed (OFDM) symbols, each of the plurality of resource element occupying a predetermined amount of time on a respective one of the plurality of subcarriers; and
transmitting a plurality of demodulation reference signal (DMRSs) in the subframe;
wherein, a first set of the plurality of CRSs is allocated to a first set of the plurality resource elements on a first symbol and a second symbol over a third subcarrier, a sixth subcarrier, a ninth subcarrier and a twelfth subcarrier, and a first set of the plurality of DMRSs is allocated to a third set of the plurality resource elements on a fifth symbol and a sixth symbol over a first subcarrier, a second subcarrier, the sixth subcarrier, a seventh subcarrier, an eleventh subcarrier and the twelfth subcarrier.

14. The method of claim 13, wherein a second set of the plurality of CRSs is allocated to a second set of the plurality resource elements on a forth symbol over the third subcarrier, the sixth subcarrier, the ninth subcarrier and the twelfth subcarrier.

15. The method of claim 13, wherein the third set of the plurality resource elements further comprises an eleventh symbol and a twelfth symbol over the first subcarrier, the second subcarrier, the sixth subcarrier, the seventh subcarrier, the eleventh subcarrier and the twelfth subcarrier.

16. A communication device for designing a reference signal pattern in a wireless communication system, the communication device comprising:
a storage device for storing a program code corresponding to a process; and a processing device coupled to a non-transitory computer readable recording medium, for processing the program code to execute the process;
wherein the process comprises:
transmitting a plurality of cell-specific reference signal (CRSs) in a subframe, the subframe comprising a plurality of resource elements that are divided in time across a plurality of subcarriers to form a plurality of orthogonal frequency division multiplexed (OFDM) symbols, each of the plurality of resource element occupying a predetermined amount of time on a respective one of the plurality of subcarriers; and
transmitting a plurality of demodulation reference signal (DMRSs) in the subframe;
wherein, a first set of the plurality of CRSs is allocated to a first set of the plurality resource elements on a first symbol and a second symbol over a third subcarrier, a sixth subcarrier, a ninth subcarrier and a twelfth subcarrier and a first set of the plurality of DMRSs is allocated to a third set of the plurality resource elements on a fifth symbol and a sixth symbol over a first subcarrier, a second subcarrier, a sixth subcarrier, a seventh subcarrier, an eleventh subcarrier and a twelfth subcarrier.

17. The communication device of claim 16, wherein a second set of the plurality of CRSs is allocated to a second set of the plurality resource elements on a forth symbol over the third subcarrier, the sixth subcarrier, the ninth subcarrier and the twelfth subcarrier.

18. The communication device of claim 16, wherein the third set of the plurality resource elements further comprises an eleventh symbol and a twelfth symbol over the first subcarrier, the second subcarrier, the sixth subcarrier, the seventh subcarrier, the eleventh subcarrier and the twelfth subcarrier.

19. A method of designing reference signal pattern for a mobile device in a wireless communication system, the method comprising:
receiving a plurality of cell-specific reference signal (CRSs) in a subframe, the subframe comprising a plurality of resource elements that are divided in time across a plurality of subcarriers to form a plurality of orthogonal frequency division multiplexed (OFDM) symbols, each of the plurality of resource element occupying a predetermined amount of time on a respective one of the plurality of subcarriers; and
receiving a plurality of demodulation reference signal (DMRSs) in the subframe;
wherein, a first set of the plurality of CRSs is allocated to a first set of the plurality resource elements on a first symbol and a second symbol over a third subcarrier, a sixth subcarrier, a ninth subcarrier and a twelfth subcarrier and a first set of the plurality of DMRSs is allocated to a third set of the plurality resource elements on a fifth symbol and a sixth symbol over a first subcarrier, a second subcarrier, a sixth subcarrier, a seventh subcarrier, an eleventh subcarrier and a twelfth subcarrier.

20. The method of claim 19, wherein a second set of the plurality of CRSs is allocated to a second set of the plurality resource elements on a forth symbol over the third subcarrier, the sixth subcarrier, the ninth subcarrier and the twelfth subcarrier.

21. The method of claim 19, wherein the third set of the plurality resource elements further comprises an eleventh symbol and a twelfth symbol over the first subcarrier, the second subcarrier, the sixth subcarrier, the seventh subcarrier, the eleventh subcarrier and the twelfth subcarrier.

22. A communication device for designing a reference signal pattern in a wireless communication system, the communication device comprising:
a storage device for storing a program code corresponding to a process; and a processing device coupled to a non-transitory computer readable recording medium, for processing the program code to execute the process;
wherein the process comprises:
receiving a plurality of cell-specific reference signal (CRSs) in a subframe, the subframe comprising a plurality of resource elements that are divided in time across a plurality of subcarriers to form a plurality of orthogonal frequency division multiplexed (OFDM) symbols, each of the plurality of resource element occupying a predetermined amount of time on a respective one of the plurality of subcarriers; and
receiving a plurality of demodulation reference signal (DMRSs) in the subframe; and wherein, a first set of the plurality of CRSs is allocated to a first set of the plurality resource elements on a first symbol and a second symbol over a third subcarrier, a sixth subcarrier, a ninth subcarrier and a twelfth subcarrier and a first set of the plurality of DMRSs is allocated to a third set of the plurality resource elements on a fifth symbol and a sixth symbol over a first subcarrier, a second subcarrier, the sixth subcarrier, a seventh subcarrier, an eleventh subcarrier and the twelfth subcarrier.

23. The communication device of claim 22, wherein a second set of the plurality of CRSs is allocated to a second set of the plurality resource elements on a forth symbol over the third subcarrier, the sixth subcarrier, the ninth subcarrier and the twelfth subcarrier.

24. The communication device of claim 22, wherein the third set of the plurality resource elements further comprises an eleventh symbol and a twelfth symbol over the first subcarrier, the second subcarrier, the sixth subcarrier, the seventh subcarrier, the eleventh subcarrier and the twelfth subcarrier.

* * * * *